United States Patent
Li et al.

(10) Patent No.: US 8,631,035 B2
(45) Date of Patent: Jan. 14, 2014

(54) METHOD FOR EFFICIENTLY SUPPORTING INTERACTIVE, FUZZY SEARCH ON STRUCTURED DATA

(75) Inventors: Chen Li, Irvine, CA (US); Shengyue Ji, Irvine, CA (US); Guoliang Li, Beijing (CN); Jiannan Wang, Beijing (CN); Jianhua Feng, Beijing (CN)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/295,767

(22) Filed: Nov. 14, 2011

(65) Prior Publication Data

US 2012/0059821 A1    Mar. 8, 2012

Related U.S. Application Data

(62) Division of application No. 12/497,489, filed on Jul. 2, 2009, now Pat. No. 8,073,869.

(51) Int. Cl.
*G06F 17/30* (2006.01)

(52) U.S. Cl.
USPC .......................................... 707/780

(58) Field of Classification Search
USPC ............. 707/748, 780, 759, 999.003
See application file for complete search history.

(56) References Cited

U.S. PATENT DOCUMENTS

| | | | | |
|---|---|---|---|---|
| 5,355,473 A * | 10/1994 | Au | ........................................ | 1/1 |
| 6,636,849 B1 * | 10/2003 | Tang et al. | ............................. | 1/1 |
| 6,728,732 B1 * | 4/2004 | Eatherton et al. | ..................... | 1/1 |
| 6,859,455 B1 * | 2/2005 | Yazdani et al. | ................ | 370/392 |
| 8,024,329 B1 * | 9/2011 | Rennison | ....................... | 707/723 |
| 8,255,377 B2 * | 8/2012 | Carpenter et al. | ............. | 707/706 |
| 2004/0260694 A1 * | 12/2004 | Chaudhuri et al. | ................ | 707/5 |
| 2005/0027744 A1 * | 2/2005 | Avadhanam et al. | ....... | 707/104.1 |
| 2005/0228768 A1 * | 10/2005 | Thusoo et al. | ..................... | 707/1 |
| 2006/0004744 A1 * | 1/2006 | Nevidomski et al. | ............. | 707/4 |
| 2007/0043750 A1 * | 2/2007 | Dingle | .......................... | 707/101 |
| 2007/0100890 A1 * | 5/2007 | Kim | ........................... | 707/104.1 |
| 2008/0091413 A1 * | 4/2008 | El-Shishiny et al. | ........... | 704/10 |
| 2008/0222094 A1 * | 9/2008 | Cox | ................................... | 707/3 |
| 2009/0253112 A1 * | 10/2009 | Cao et al. | ....................... | 434/322 |
| 2009/0319521 A1 * | 12/2009 | Groeneveld et al. | .............. | 707/6 |
| 2011/0113039 A1 * | 5/2011 | Venkataraman et al. | ..... | 707/748 |

OTHER PUBLICATIONS

H. Shang and T.H. Merrettal, "Tries for Approximate String Matching", IEEE Transactions on knowledge and data Engineering, vol. 8, Aug. 1996.*

Holger Bast, Ingmar Weber, "Type Less, Find More: Fast Autocompletion Search with a Succinct Index", Max-Planck-Institute fur Informatik Saarbucken, Germany, Aug. 2006.*

* cited by examiner

*Primary Examiner* — Mohammed R Uddin
(74) *Attorney, Agent, or Firm* — Marcus C. Dawes; Daniel L. Dawes

(57) ABSTRACT

A method to support efficient, interactive, and fuzzy search on text data includes an interactive, fuzzy search on structured data used in applications such as query relaxation, autocomplete, and spell checking, where inconsistencies and errors exist in user queries as well as data. It utilizes techniques to efficiently and interactively answer fuzzy queries on structured data to allow users to efficiently search for information interactively, and they can find records and documents even if these records and documents are slightly different from the user keywords.

9 Claims, 11 Drawing Sheets

UCI People Search

Search by Name, Nick Name, UCInetID, Title, Department, Major, Office Address, Phone Number, EMail Address, and Zot Code

| professor smyt| | | | | | |
|---|---|---|---|---|---|---|
| Patrick J. SMYTH | Padhraic SMYTH | pjsmyth | Professor | Computer Science-Computing | (949) 824-2558 | 4062... |
| Janellen Smith | | jesmith7 | Professor | Dermatology | (949) 824-5515 | C252... |
| Clyde W. SMITH | | smithcw | Clinical Professor | Radiological Sciences | (714) 455-5033 | Bldg... |
| John H. SMITH | | jhsmith | Professor and Chair | German | (949) 824-6406, 6107 | 400G... |

*FIG. 1* iSearch on DBLP

Search 1,062,361 papers by Author, Title, DockTitle, and Year

| chritos feloutz| | | |
|---|---|---|---|
| Gray Codes for Partial Match and Range Queries. | Christos Faloutsos | | 1988 |
| Signature-Based Test Retrieval Methods. A Survey | Christos Faloutsos | | 1990 |
| Future directions in data mining streams, networks, self-similarity and power laws | Christos Faloutsos | CIKM | 2002 |

*FIG. 2*

METHOD FOR EFFICIENTLY SUPPORTING INTERACTIVE, FUZZY SEARCH ON STRUCTURED DATA

RELATED APPLICATIONS

The present application is related to U.S. patent application Ser. No. 12/497,489, filed Jul. 2, 2009 which is incorporated herein by reference and to which priority is claimed pursuant to 35 USC 120.

GOVERNMENT RIGHTS

This invention was made with Government support under Grant No. 0238586, awarded by the National Science Foundation. The Government had certain rights in the invention.

BACKGROUND OF THE INVENTION

1. Field of the Invention

The invention relates to the field of interactive fuzzy-logic searches of string databases using a computer.

2. Description of the Prior Art

Traditional information systems return answers to a user after the user submits a complete query. Users often feel "left in the dark" when they have limited knowledge about the underlying data or the entities they are looking for, and have to use a try-and-see approach for finding information. A recent trend of supporting autocomplete in these systems is a first step towards solving this problem.

In information systems, often users cannot find their interesting records or documents because they don't know the exact representation of the entity in the backend repository. For example, a person Dame "John Lemmon" could be mistakenly represented as "Johnny Lemon". A person called "William Gates" could be stored as "Bill Gates." As a result, a user might not be able to find the records if he doesn't know the exact spelling of the person he is looking for. The same problem exists especially for the case where data came from various Web sources, which tends to be heterogeneous and noisy.

What is needed is a method which allows information systems to answer queries even if there is a slight mismatch between the user query and the physical representation of the interesting entities.

What is needed is a method that can also allow users to interactively query the repository as they type in their query.

In order to give instant feedback when users formulate search queries, many information systems are supporting autocomplete search, which shows results immediately after a user types in a partial query. As an example, almost all the major search engines nowadays automatically suggest possible keyword queries as a user types in partial keywords. Both Google Finance and Yahoo! Finance support searching for stock information as users type in keywords. Most autocomplete systems treat a query with multiple keywords as a single string, and find answers with text that matches the string exactly. As an illustrative example, consider the search box on the home page of Apple Inc. that supports autocomplete search on its products. Although a keyword query "itunes" can find a record "itunes wi-fi music store", a query with keywords "itunes music" cannot find this record (as of June 2009), simply because these two keywords appear at different places in the record.

To overcome this limitation, a new type-ahead search paradigm has emerged recently. A system using this paradigm treats a query as a set of keywords, and does a full-text search on the underlying data to find answers including the keywords. An example is the CompleteSearch system on DBLP2, which searches the underlying publication data "on the fly" as the user types in query keywords letter by letter. For instance, a query "music sig" can find publication records with the keyword "music" and a keyword that has "sig" as a prefix, such as "sigir", "sigmod", and "signature". In this way, a user can get instant feedback after typing keywords, thus can obtain more knowledge about the underlying data to formulate a query more easily.

A main challenge in fuzzy type-ahead search is the requirement of high efficiency. To make search interactive, from the time the user has a keystroke to the time the results computed from the server are displayed on the user's browser, the delay should be as small as possible. An interactive speed requires this delay be within milliseconds. Notice that this time includes the network transfer delay, execution time on the server, and the time for the browser to execute its javascript (which tends to be slow). Providing a high efficiency is especially important since the system needs to answer more queries than a traditional system that answers a query only after the user finishes typing a complete query.

The problem includes how to answer ranking queries in fuzzy type-ahead search on large amounts of data. Consider a collection of records such as the tuples in a relational table. As a user types in a keyword query letter by letter, we want to on-the-fly find records with keywords similar to the query keywords. We treat the last keyword in the query as a partial keyword the user is completing. We assume an index structure with a trie for the keywords in the underlying data, and each leaf node has an inverted list of records with this keyword, with the weight of this keyword in the record. As an example, Table IV shows a sample collection of publication records. For simplicity, we only list some of the keywords for each record. FIG. 9 shows the corresponding index structure.

Suppose a user types in a query "music icde li". We want to find records with keywords similar to these keywords, and rank them to find the best answers. To get the answers, for each query keyword, we can find keywords similar the query keyword. For instance, both the keywords "icdt" and "icde" are similar to the second query keyword. The last keyword "li" is treated as a prefix condition, since the user is still typing at the end of this keyword. We find keywords that have a prefix similar to "li", such as "lin", "liu", "lui", "icde", and "icdt". We access the inverted lists of these similar keywords to find records and rank them to find the best answers for the user.

A key question is: how to access these lists efficiently to answer top-k queries? In the literature there are many algorithms for answering top-k queries by accessing lists. These algorithms share the same framework originally proposed by Fagin, in which we have lists of records sorted based on various conditions. An aggregation function takes the scores of a record from these lists and computes the final score of the record. There are two methods to access these lists: (1) Random Access: Given a record id, we can retrieve the score of the record on each list; (2) Sorted Access: We retrieve the record ids on each list following the list order.

BRIEF SUMMARY OF THE INVENTION

We disclose a method and apparatus for an information-access paradigm, called "iSearch," in which the system searches on the underlying data "on the fly" as the user types in query keywords. It extends autocomplete interfaces by (1) supporting queries with multiple keywords on data with multiple attributes; and (2) finding relevant records that may not match query keywords exactly. This framework allows users to explore data as they type, even in the presence of minor errors.

There are challenges in this framework for large amounts of data. The first one is search efficiency. Since each keystroke of the user could invoke a query on the backend, we need efficient algorithms to process each such query within milliseconds. We develop a caching-based technique to support incremental computation on a trie index structure. The second challenge is supporting fuzzy search with an interactive speed. We propose a technique to do incremental computation with efficient pruning and caching. We have developed several real prototypes using these techniques. One of them has been deployed to support interactive search on the UCI directory, which has been used regularly and well received by users due to its friendly interface and high search efficiency.

One of the illustrated embodiments of the invention is a method to support efficient, interactive, and fuzzy search on text data. Interactive, fuzzy search on structured data is important in applications such as query relaxation, autocomplete, and spell checking, where inconsistencies and errors exist in user queries as well as data. In this embodiment, we developed techniques to efficiently and interactively answer fuzzy queries on structured data. Most of existing algorithms cannot support interactive, fuzzy search. After a user types in a query with keywords, these algorithms find records and documents that include these keywords exactly.

The techniques of the illustrated embodiment allows users to efficiently search for information interactively, and they can find records and documents even if these records and documents are slightly different from the user keywords. In the illustrated embodiment of the invention, we developed the following novel techniques to effectively, efficiently, and interactively answer fuzzy search over structured data:

1) We use tree-based indexes to efficiently index the data and use an algorithm to traverse the tree as the user types in a query.
2) We adaptively maintain the intermediate results for the query to support interactive, fuzzy search.
3) We develop good ranking algorithms to sort the candidate results.

We have developed an online demo called PSearch, available at http://psearch.ics.uci.edu/. The goal of the PSearch Project is to make it easier to search for people at the University of California at Irvine. It has a single input search box, which allows keyword queries on people name, UCInetID, telephone number, department, and title. It has the following features:

Supports interactive search: search as you type;
Allows minor errors in the keywords;
Supports synonyms, e.g., "William=Bill" and "NACS=Network and Academic Computing Services".
Allows multiple keywords; We use the UCI Directory data provided by NACS.

The illustrated embodiment of the invention may be used in information systems that need to allow users to interactively search for text data even with minor errors. For example, E-commerce Web sites that have structured data about their products can benefit from our techniques. Services that allow people to search for people can also use our techniques to make their search more powerful. The illustrated embodiment of the invention can also be used to allow users to browse data in underlying databases.

In the context of the illustrated embodiment we consider how to support these two types of operations efficiently by utilizing characteristics specific to our problem setting, so that we can adopt these algorithms to solve our problem. We make the following contributions. We present two efficient algorithms for supporting random access on the inverted lists. Both require a forward index on the data, and their performance depends on the number of keywords in each record. We consider how to support sorted access on the inverted lists efficiently. We identify an important subclass of ranking functions, which have been proven to be very effective in several systems we have deployed. We develop a list-pruning technique to improve the performance. We consider how to further improve the performance of sorted access by list materialization, i.e., precomputing and storing the union of the leaf-node inverted lists for a trie node. We show how to use materialized lists properly to improve the performance. We then consider how to select trie nodes to materialize their lists given a space constraint in order to maximize query performance. We show our experimental results on several real data sets to show the query performance of algorithms using our techniques. We also give suggestions on how to use these techniques in applications with large data sets.

Preliminaries: Data and Queries: We first review the problem of fuzzy type ahead search. Let R be a collection of records such as the tuples in a relational table. Let D be the set of words in R. As a user types in a keyword query letter by letter, we want to on-the-fly find records with keywords similar to the query keywords. We use edit distance to measure the similarity between strings. Formally, the edit distance between two strings $s_1$ and $s_2$, denoted by $ed(s_1, s_2)$, is the minimum number of single-character edit operations (i.e., insertion, deletion, and substitution) needed to transform $s_1$ to $s_2$. For example, ed(icde, idt)=2.

Let Q be a query the user has typed in, which is a sequence of keywords $[w_1, w_2, :::, w_m]$. We treat the last keyword $w_m$ as a partial keyword the user is completing. We want to find the keywords in the data set that are similar to query keywords, since records with such a keyword could be of interest to the user.

Let $\pi$ be a function that quantifies the similarity between a string s and a query keyword w in D. An example is:

$$\pi(s,w)=1-ed(s,w)/|w|,$$

where |w| is the length of the keyword w. We normalize the edit distance based on the query-keyword length in order to allow more errors for longer query keywords. Our results in the paper focus on this function, and they can be generalized to other functions using edit distance.

a. Let d be a keyword in D. For each complete keyword $w_i$ (i=1, :::, m−1), we define the similarity of d to $w_i$ as:

$$Sim(d,w_i)=\pi(d,w_i).$$

Since the last keyword $w_m$ is treated as a prefix condition, we define the similarity of d to $w_m$ as the maximal similarity of d's prefixes using function $\pi$, i.e.: $Sim(d, w_m)$=max prefix p of d $\pi(p, w_m)$: Let $\tau$ be a similarity threshold. We say a keyword in D is similar to a query keyword w if $Sim(d, w) \geq \tau$. We say a prefix p of a keyword in D is similar to the query keyword $w_m$ if $\pi(p, w_m) \geq \tau$. Let $\phi(w_i)(i=1, :::, m)$ denote the set of keywords in D similar to $w_i$, and $P(w_m)$ denote the set of prefixes (of keywords in D) similar to $w_m$.

In our running example, suppose a user types in a query "icde li" letter by letter on the data shown in Table IV. Suppose the similarity threshold $\tau$ is 0:45. Then the set of prefixes similar to the partial keyword "li" is P("li")={l, li, lin, liu, lu, lui, i} and the set of data keywords similar to the partial keyword "li" is $\phi$("li")={lin, liu, lui, icde, icdt}. In particular, "lui" is similar to "li" since Sim(lui, li)=1−ed(lui, li)/|li|=0:5 $\tau$. The set of similar words for the complete keyword "icde" is $\phi$("icde")={icde, icdt}. Notice that in the running example, for simplicity, we use a relatively small similarity threshold r. Increasing the threshold can reduce the number of similar prefixes on the trie.

Top-k Answers:

We rank each record r in R based on its relevance to the query. Let F(,) be such a ranking function that takes the query Q and a record r∈R, and computes a score F(r, Q) as the relevance of the record r to the query Q. Given a positive integer k, our goal is to compute the k best records in R ranked by their relevance to Q. Notice that our problem setting allows an important record to be in the answer, even if not all the query keywords have a similar keyword in the record. We want to compute these records efficiently as the user modifies the query by adding more letters, or modifying or deleting the letters in Q. Without loss of generality, each string in the data set and a query is assumed to only use lower case letters.

An effective ranking function F computes the relevance score F(r, Q) based on the similarities of the keywords in r and those keywords in the query. Notice that a keyword d in the record could have different prefixes with different similarities to the partial keyword $w_m$, and we can take their maximal value as the overall similarity between d and $w_m$. The function also considers the importance of each keyword in the record. A keyword in record r has a weight with respect to r, such as the term frequency and inverse document frequency (TF/IDF) of the keyword in the record. Notice that this setting covers the specific cases where each record has a keyword independent weight, such as the rank of a Web page if a record is a URL with tokenized keywords, and the number of publications of an author if a record is an author.

Indexing and Searching:

To support fuzzy type-ahead search efficiently, we construct a trie for the data keywords in D. A trie node has a character label. Each keyword in D corresponds to a unique path from the root to a leaf node on the trie. For simplicity, a trie node is mentioned interchangeably with the keyword corresponding to the path from the root to the node. A leaf node has an inverted list of pairs [rid, weight]i, where rid is the ID of a record containing the leaf-node string, and weight is the weight of the keyword in the record. FIG. 9 shows the index structure in our running example. For instance, for the leaf node of keyword "lin", its inverted list has five elements. The first element "[$r_3$, 9]" indicates that the record $r_3$ has this keyword, and the weight of this keyword in this record is "9".

We compute the top-k answers to the query Q in two steps. In the first step, for each keyword $w_i$ in the query, we compute the similar keywords $\phi(w_i)$ and similar prefixes $P(w_m)$ on the trie (shown in FIG. 10). We disclosed above an efficient algorithm for incrementally computing these similar strings as the user modifies the current query. In our running example, the keyword "icde" in the query has two similar data keywords $\phi$("icde")={icde, icdt}. The partial keyword has seven similar prefixes, i.e., P("li")={l, li, lin, liu, lu, lui, i}. They have five leaf-node keywords: "lin", "liu", "lui", "icde", and "icdt" . . . .

In the second step, we access the inverted lists of these similar data keywords to compute the k best answers to the query. Many algorithms have been proposed for answering top-k queries by accessing sorted lists. When adopting these algorithms to solve our problem, we need to efficiently support two basic types of access used in these algorithms: random access and sorted access on the lists. Below we consider how to efficiently support these two access methods, and the corresponding requirements on the index structure.

Supporting Random Access Efficiently a. Consider how to support efficient random access in order to adopt existing top-k algorithms in the literature. In each random access, given an ID of a record r, we want to retrieve information related to the keywords in the query Q, which allows us to compute the score F(r, Q). In particular, for a keyword $w_i$ in the query, does the record r have a keyword similar to $w_i$? One naive way to get the information is to retrieve the original record r and go through its keywords. This approach has two limitations. First, if the data is too large to fit into memory and has to reside on hard disks, accessing the original data from the disks may slow down the process significantly. This costly operation will prevent us from achieving an interactive-search speed. Its second limitation is that it may require a lot of computation of string similarities based on edit distance, which could be time consuming.

b. Here we present two efficient approaches for solving this problem. Both require a forward index in which each record has a forward list of the IDs of its keywords and their corresponding weights. We assume each keyword has a unique ID corresponding its leaf node on the trie, and the IDs of the keywords follow their alphabetical order. FIG. 11 shows the forward lists in our running example. The element "[1, 9]" on the forward list of record $r_3$ shows that this record has a keyword with the ID "1", which is the keyword "lin" as shown on the trie. The weight of this keyword in this record is "9". For simplicity, in the discussion we focus on how to verify whether the record has a keyword with a prefix similar to the partial keyword $w_m$. With minor modifications the discussion extends to the case where we want to verify whether r has a keyword similar to a complete keyword $w_i$ in the query.

Method 1: Probing on Forward Lists

This method maintains, for each trie node n, a keyword range [In, un], where In and un are the minimal and maximal keyword IDs of its leaf nodes, respectively. An interesting observation is that a complete word with n as a prefix must have an ID in this keyword range, and each complete word in the data set with an ID in this range must have a prefix of n. In FIG. 11, the keyword range of node "li" is [1, 3], since 1 is the smallest ID of its leaf nodes and 3 is the largest ID of its leaf nodes.

Based on this observation, this method verifies whether record r contains a keyword with a prefix similar to $w_m$ as 4 follows. For a prefix p on the trie similar to $w_m$ (computed in the first step of the algorithm as described in Section II), we check if there is a keyword ID on the forward list of r in the keyword range [$I_p$, $u_p$] of the trie node of p. Since we can keep the forward list of r sorted, this checking can be done efficiently. In particular, we do a binary search using the lower bound $I_p$ on the forward list of r to get the smallest ID ° no less than $I_p$. The record has a keyword similar to $w_m$ if γ exists and is no greater than the upper bound $u_p$, i.e., γ≤$u_p$.

In our running example, suppose we want to verify whether the record $r_3$ contains a complete word with a prefix similar to the partial keyword "li". For each of its similar prefixes, we check if its range contains a keyword in the record. For instance, consider the similar prefix "li" with the range [1, 3]. Using a binary search on the forward list ([1, 9], [3, 4], [5, 4]) of $r_3$, we find a keyword ID 1 in this range. Thus we know that the record indeed contains a keyword similar to this prefix.

B. Method 2: Probing on Trie Leaf Nodes

Using this method, for each prefix p similar to $w_m$, we traverse the subtrie of p and identify its leaf nodes. For each leaf node d, we store the fact that for the query Q, this keyword d has a prefix similar to $w_m$ in the query. Specifically, we store

[Query ID,partial keyword $w_m$,sim(p,$w_m$)].

We store the query ID in order to differentiate it from other queries in case multiple queries are answered concurrently.

We store the similarity between $w_m$ and p to compute the score of this keyword in a candidate record. In case the leaf node has several prefixes similar to $w_m$, we only keep their maximal similarity to $w_m$. For each keyword $w_i$ in the query, we also store the same information for those trie nodes similar to $w_i$. Therefore, a leaf node might have multiple entries corresponding to different keywords in the same query. We call these entries for the leaf node as its collection of relevant query keywords. This collection can be implemented as a hash table using the query ID as the key, or an array sorted based on the query ID. Notice that this structure needs very little storage space, since the entries of old queries can be quickly reused by new queries, and the number of keywords in a query tends to be small.

We use this additional information to efficiently check if a record r contains a complete word with a prefix similar to the partial keyword $w_m$. We scan the forward list of r. For each of its keyword IDs, we locate the corresponding leaf node on the trie, and test whether its collection of relevant query keywords includes this query and the keyword $w_m$. If so, we use the stored string similarity to compute the score of this keyword in the query.

FIG. 12 shows how we use this method in our running example, where the user types in a keyword query q1=[icde, li]. When computing the complete words of "li", for each of its leaf nodes such as "lin" and "liu", we insert the query ID (shown as "$q_1$"), the partial keyword "li", and the corresponding prefix similarity to its collection of relevant query keywords. To verify whether record $r_3$ has a word with a prefix similar to "li", we scan its forward list. Its first keyword is "lin". We access its corresponding leaf node, and see that the node's collection of relevant query keywords includes this query partial keyword. We can retrieve the corresponding prefix similarity to compute the score of this keyword with respect to this query.

C. Comparing Two Methods

The time complexity of method 1 is $O(G*\log(|r|))$, where G is the total number of similar prefixes of $w_m$ and similar complete keywords of $w_i$'s for $1 \cdots m-1$, and $|r|$ is the number of distinct keywords in record r. Since the similar prefixes of $w_m$ could have ancestor-descendant relationships, we can optimize the step of accessing them by only considering those "highest" ones.

The time complexity of the second method is $$\sum_{\text{prefix } p \text{ of } w_m} |Tp| + |r| * |Q|.$$

The first term corresponds to the time of traversing the subtries of similar prefixes, where $T_p$ is the size of the subtrie at a similar prefix p. The second term corresponds to the time of probing the leaf nodes, where |Q| is the number of query keywords. Notice that to identify the answers, we need access the inverted lists of complete words, thus the first term can be removed from the complexity. Method 1 is preferred for data sets where records have a lot of keywords such as long documents, while method 2 is preferred for data sets where records have a small number of records such as relational tables with relatively short attribute values. For both methods, we can retrieve the weight of a keyword in the record and the similarity between the record keyword and the corresponding query keyword, which is precomputed on the trie. We use this weight and similarity to compute a score of this query keyword with respect to the record.

Supporting Sorted Access Efficiently

Consider how to do sorted access efficiently in algorithms for computing top-k answers. Existing top-k algorithms assume we are given multiple lists sorted based on various conditions. Each record has a score on a list, and we use an aggregation function to combine the scores of the record on different lists to compute its overall relevance to the query. The aggregation function needs to be monotonic, i.e., decreasing the score of a record on a list cannot increase the record's overall score. In our problem, for each data keyword similar to a keyword in the query, we have an inverted list sorted based on the weight of the keyword in a record. Thus we can adopt an existing top-k algorithm to solve our problem by accessing these sorted lists, assuming the ranking function is monotonic with respect to the weights on the lists. This approach has the advantage of allowing a general class of ranking functions. On the other hand, its performance could be low since the number of lists for a query could be large (in tens of thousands or even hundreds of thousands), especially since the last prefix keyword $w_m$ can have multiple similar prefixes, each of which can have multiple leaf nodes, and accessing these lists can be costly. For instance, there are about tens of thousands of inverted lists for each query on DBLP dataset. Next we consider how to improve the performance of sorted access on an important class of ranking functions.

Important Class of Ranking Functions

An interesting observation in our problem setting is that the inverted lists of a query form groups naturally. In particular, each complete keyword $w_i$ has several inverted lists corresponding to its similar data keywords in $\phi(w_i)$, the last partial keyword $w_m$ has several similar prefixes in $P(w_m)$, each of which has multiple leaf nodes. These groups allow us to improve the sorted-access performance for a large class of ranking functions F with the following two properties.

Property 1: The score F(r, Q) of a record r to a query Q is a monotonic combination of scores of the query keywords with respect to the record r.

Formally, we compute the score F(r, Q) in two steps. In the first step, for each keyword w in the query, we compute a score of the keyword with respect to the record r and the query, denoted by Score(r, w, Q). In the second step, we compute the score F(r, Q) by applying a monotonic function on the Score(r, w, Q)'s for all the keywords w in the query. The intuition of this property is that the more relevant an individual query keyword is to a record, the more likely this keyword is a good answer to this query. As we will see shortly, this property allows us to partition all the inverted lists into different groups based on query keywords. In our running example, we compute the score of a record to the query "icde li" by aggregating the scores of each of the query keywords "icde" and "li" with respect to the record.

The next question is how to compute the value Score(r, w, Q), especially since the keyword w can be similar to multiple keywords in the record r. Let d be a keyword in record r such that d is similar to the query keyword w, i.e., $d \in \phi(w)$. We use Score(r, w, d) to denote the relevance of this query keyword w to the record keyword d. The value should depend on both the weight of w in r as well as the similarity between w and d, i.e., Sim(d, w). Intuitively, the more similar they are, the more relevant w is to d.

Property 2: The relevance value Score(r, w, Q) for a query keyword w in the record is the maximal value of the Score(r, w, d)'s for all the keywords d in the record. This property states that we only look at the most relevant keyword in a record to a query keyword when computing the relevance of the query keyword to the record. It means that the ranking function is "greedy" to find the most relevant keyword in the record as an indicator of how important this record is to the user query. In addition, as we can see shortly, this property allows us to do effective pruning when accessing the multiple lists of a query keyword. In several prototype systems we have implemented, we used ranking functions with these two properties, and the function have been proved to be very effective.

In the following, as an example, we use the following ranking function with the two properties to discuss techniques to support efficient sorted access.

$$F(r, Q) = \sum_{i=1}^{m} \text{Score}(r, w_i, Q) \quad (1)$$

where $$\text{Score}(r, w_i, Q) = \max_{\text{record keyword } d \text{ in } r} \{\text{Score}(r, w_i, d)\} \quad (2)$$

and $$\text{Score}(r, w_i, d) = \text{Sim}(d, w_i) * \text{Weight}(d, r) \quad (3)$$

In the last formula, $\text{Sim}(d, w_i)$ is the similarity between complete keyword $w_i$ and record keyword d, and $\text{Weight}(d, r)$ is the weight of d in record r.

B. Accessing Lists in Groups

The first property allows us to partition the inverted lists into several groups based on their corresponding query keywords. Each query keyword w has a group of inverted lists, which can produce a list of record IDs sorted on their scores with respect to this keyword. On top of these sorted lists of groups, we can adopt an existing top-k algorithm to find the k best records for the query.

For each group of inverted lists for the query keyword w, we need to support sorted access that retrieves the next most relevant record ID for w. Fully computing this sorted list L(w) using the keyword lists is expensive in terms of time and space. We can support sorted access on this list L(w) efficiently by building a max heap on the inverted lists. In particular, we maintain a cursor on each inverted list in the group. The heap consists of the record IDs pointed by the cursors so far, sorted on the scores of the similar keywords in these records. Notice that each inverted list is already sorted based on the weights of its keyword in the records, and all the records on this list share the same similarity between this keyword and the query keyword w. Thus this list is also sorted based on the scores of this keyword in these records. To retrieve the next best record from this group, we pop the top element 6 from the heap, increment the cursor of the list of the popped element by 1, and push the new element of this list to the heap. The second property allows us to ignore other lists that may produce this popped record, since their corresponding scores will no longer affect the score of this record with respect to the query keyword w. Since our method does not need to compute the entire list of L(w), we call L(w) the virtual sorted list of the query keyword w.

In our running example, FIG. 13 shows the two heaps for a query Q with two keywords "icde" and "li". For illustration purposes, for each group of lists we also show the virtual merged list of records with their scores, and this list is only partially computed during the traversal of the underlying lists. Each record on a heap has an associated score of this keyword with respect to the query keyword, computed using Equation 3. For instance, for record 1 on the inverted list of the keyword "lui" similar to the query keyword "li", we have $\text{Score}(r_1, \text{li}, Q) = (1_i \text{ ed}(\text{lui}, \text{li})/|\text{li}|) * \text{Weight}(r_1, \text{lui}) = 4$.

Suppose we want to compute the top-2 best answers based on the functions described above, by doing sorted access only. We first pop the top elements of the two max heaps, $[r_4, 9]$ and $[r_3, 9]$, and compute an upper bound on the overall score of an answer, i.e., 18. We increment the cursors of the lists that produce these top elements, push them to the heaps, and retrieve the next two top elements: $[r_5, 8]$ and $[r_5, 8]$. The new score upper bound becomes 16. After retrieving the four elements of every max heap, we can compute the top-2 records together with their scores: $[r_5, 16]$ and $[r_4, 16]$.

C. Pruning Low-Score Lists

We can further improve the performance of sorted access on the virtual sorted list L(w) of the query keyword w using the idea of "on-demand heap construction," i.e., we want to avoid constructing a heap for all the inverted lists of keywords similar to a query keyword. Let $L_1, ::: , L_t$ be these inverted lists with the similar keywords $d_1, ::: , d_t$, respectively. Each push/pop operation on the heap of these lists takes $O(\log(t))$ time. If we can reduce the number of elements on the heap, we can reduce the cost of its push/pop operations. Intuitively, we sort these inverted lists based on the similarities of their keywords to w, i.e., w), $::: ,\text{sim}(d_t, w)$. We first construct the max heap using the lists with the highest similarity values. Suppose $L_i$ is a list not included in the heap so far. We can derive an upper bound $u_i$ on the score of a record from $L_i$ (with respect to the query keyword w) using the largest weight on the list and the string similarity $\text{Sim}(d_i, w)$. Let r be the top record on the heap, with a score $\text{Score}(r, w, Q)$. If $\text{Score}(r, w, Q) \geq u_i$ then this list does not need to be included in the heap, since it cannot have a record with a higher score. Otherwise, this list needs to be included in the heap.

Based on this analysis, each time we pop a record from the heap and push a new record r to it, we compare the score of the new record with the upper bounds of those lists not included in the heap so far. For those lists with an upper bound smaller than this score, they need to be included in the heap from now on. Notice that this checking can be done very efficiently by storing the maximal value of these upper bounds, and ordering these lists based on their upper bounds.

We have two observations about this pruning method. (1) As a special case, if those keywords matching a query keyword exactly have the highest relevance scores, this method allows us to consider these records prior considering other records with mismatching keywords. Thus this method is consistent with the idea "exactly-matched records should come out first and fast." (2) The pruning power can be even more significant if the query keyword w is the last prefix keyword $w_m$, since many of its similar keywords share the same prefix p on the trie similar to $w_m$. We can compute an upper bound of the record scores from these lists and store the bound on the trie node p. In this way, we can prune the lists more effectively by comparing the value $\text{Score}(r, w, Q)$ with this upper bound stored on the trie, without needing to on-the-fly compute the upper bound.

In our running example of the query "icde li", FIG. 13 illustrates how we can prune low-score lists and do on-demand heap constructions. The prefix "li" has several similar keywords. Among them, the two words "lin" and "liu" have the highest similarity value to the query keyword, mainly because they have a prefix matching the keyword exactly. We build a heap using these two lists. We compute the upper bounds of record scores for the lists "liu", "icde", and "icdt", which are 3, 4.5, 3, respectively. These lists are never included in the heap since their upper bounds are always smaller than the scores of popped records before the traversal terminates.

As "icde" and "icdt" share the same similar prefix "i" for "li", they have the same similarity to "li". We can store the upper bound of the weights in the inverted lists of "icde" and "icdt" on trie node "i". We compute the upper bound score of "icde" and "icdt" using the stored weight, instead of retrieving leaf-descendants of "i" to compute the bound. The improvement is significant if there are multiple similar 7 words share a similar prefix. Similarly, for the query keyword "icde", using the pruning method we only need to build a heap using a single list, which is the one corresponding to the keyword "icde" on the trie. The list of the keyword "icdt" is pruned and never included in the heap.

Improving Sorted Access By List Materialization

Consider how to further improve the performance of sorted access by precomputing and storing the unions of some of the inverted lists on the trie. Let v be a trie node, and $\cup(v)$ be the union of the inverted lists of v's leaf nodes, sorted by their record weights. If a record appears more than once on these lists, we choose its maximal weight as its weight on list $\cup(v)$. We call $\cup(v)$ the union list of node v. For example, the union list of the trie node "li" in our running example has $[r_3, 9]$, $[r_5, 8]$, $[r_7, 8]$, $[r_4, 7]$, $[r_6, 5]$, $[r_9, 4]$, $[r_2, 3]$, and $[r_8, 1]$. When using a max heap to retrieve records sorted by their scores with respect to a query keyword, this materialized union list could help us build a max heap with fewer lists and reduce the cost of push/pop operations on the heap. Therefore, this method allows us to utilize additional memory space to answer top-k queries more efficiently.

The benefit of list materialization on sorted access on a max heap is especially significant for the last prefix keyword $w_m$, since it could have multiple similar prefixes on the trie, which correspond to many leaf-node keywords. Thus in the remainder of this section we mainly focus on the cost-benefit analysis for this prefix keyword $w_m$. We first discuss how to use materialized union lists to speed up sorted access below, and then consider how to select trie nodes to materialize their union lists given a space constraint below.

Utilizing Materialized Union Lists Properly

Suppose v is a trie node whose union list $\cup(v)$ has been materialized. One subtlety in using $\cup(v)$ to speed up sorted access for the prefix keyword $w_m$ is that $\cup(v)$ is sorted based on its record weights, while the push/pop operations on the max heap require each list on the heap be sorted based on its record scores with respect to $w_m$. Recall that the value Score $(r, w_m, d_i)$ of a record r on the list of a keyword $d_i$ with respect to $w_m$ is based on both Weight(di, r) and Sim(di, $w_m$). In order to use $\cup(v)$ to replace the lists of v's leaf nodes in the max heap, the following two conditions need to be satisfied:

All the leaf nodes of v have the same similarity to $w_m$.

All the leaf nodes of v are similar to $w_m$, i.e., their similarity to $w_m$ is no less than the threshold τ.

When the conditions are satisfied, the sorting order of the union list $\cup(v)$ is also the order of the scores of the records on the leaf-node lists with respect to $w_m$. In this case, we call the union list $\cup(v)$ "usable" for the max heap of the query keyword $w_m$. For instance, consider the index in FIG. 9 and a query "music icd". For the query keyword "icd", we access its similar data keywords "icde" and "icdt", and build a max heap on their inverted lists based on record scores with respect to this query keyword. For the trie node "icd", both of its leaf nodes are similar to the query keyword (with the same similarity), its union list is usable for the max heap of this keyword. That is, we can use its materialized union list in the max heap of these two inverted lists, saving the time to traverse these two lists.

Materializing $\cup(v)$ has the following performance benefits for the max heap for $w_m$. (1) We do not need to traverse the trie to access these leaf nodes and use them to construct the max heap, (2) Each push/pop operation on the heap is more efficient since its has fewer lists. Notice that if v has an ancestor v' with a materialized union list $\cup(v')$ also usable for the max heap, then we can use the materialized list $\cup(v')$ instead of $\cup(v)$, and the list $\cup(v)$ will no longer benefit the performance of this max heap.

B. Choosing Union Lists to Materialize

Let B be a budget of storage space we are given to materialize union lists. Our goal is to select trie nodes to materialize their union lists to maximize the performance of queries. The following are several naive algorithms for choosing trie nodes:

Random: We randomly select trie nodes.

TopDown: We select nodes top down from the trie root.

BottomUp: We select nodes bottom up from the leaf nodes.

Each naive approach keeps choosing trie nodes to materialize their union lists until the sum of their list sizes reaches the space limit B. One main limitation of these approaches is that they do not quantitatively consider the benefits of materializing a union list. To overcome this limitation, we propose a cost based method called CostBased to do list materialization. Its main idea is the following.

For simplicity we say a node has been "materialized" if its union list has been materialized. For a query Q with a prefix keyword $w_m$, suppose some of the trie nodes have their union lists materialized. Let v be the highest trie node that is usable for the max heap of $w_m$, and $\cup(v)$ has not been materialized. Materializing the union list of an ancestor of v does not have any benefit on this max heap, since the score order of their records might not be consistent with the weight order or these records. For each non-leaf trie descendant c of v, such that no node on the path from v to c (including c) has been materialized. We can do a cost-based analysis to quantify the benefit of materializing $\cup(c)$ on the performance of operations on the max heap of $w_m$. If v has a descendant node c' that has a materialized list, then materializing the descendants of c' will no longer benefit the max heap for $w_m$.

Here we present an analysis of the benefits of materializing the usable node v. In general, for a trie node n, let T(n) denote its subtrie, |T(n)| denote the number of nodes in T(v), and D(n) denote the set of n's leaf nodes. The total time of traversing this subtrie and accessing the inverted lists of its leaf nodes is $O(|T(v)|+|D(v)|)$.

As illustrated in FIG. 14, suppose v has materialized descendants. Let M(v) be the set of highest materialized descendants of v. These materialized nodes can help reduce the time of accessing the inverted lists of v's leaf nodes in two ways. First, we do not need to traverse the descendants of a materialized node d∈M(v). We can just traverse $$|T(v)| - \sum_{d \in M(v)} |T(d)|$$

trie nodes. Second, when inserting lists to the max heap of $w_m$, we insert the union list of each d∈M(v) and the inverted lists of d'∈N(v) into the heap, where N(v) denotes the set of v's leaf descendants having no ancestors in M(v). Let S(v)=M(v) ∪N(v). Now we quantify the benefits of materializing the node v:

Reducing Traversal Time:

Since we do not need to traverse v's descendants, the time reduction is $$B_1 = O\left(|T(v)| - \sum_{d \in M(v)} |T(d)|\right)$$

Reducing Heap-Construction Time:

When constructing the max heap for the query keyword $w_m$, we insert the union list $\cup(v)$ into the heap, instead of the inverted lists of those nodes in $S(v)$. The time reduction is $B_2 = |S(v)| - 1$.

Reducing sorted-access time: If we insert the union list $\cup(v)$ to the max heap of $w_m$, the number of leaf nodes in the heap is $$S_{w_m} = \sum_{a \in P(w_m)} S_a.$$

Otherwise, it is $S_{w_m} + |S(v)| - 1$. The time reduction of a sorted access is $B_3 = O(\log(S_{w_m} + |S(v)| - 1)) - O(\log(S_{w_m}))$ The following is the overall benefit of materializing v for the query keyword query $w_m$:

$$B_v = B_1 + B_2 + A_v * B_3, \quad (4)$$

where $A_v$ is the number of sorted accesses on $\cup(v)$. The analysis above is on a single query. Suppose we are given a query workload. For each trie node, we can quantify the benefits of materializing its union list with respect to the workload by taking the summation of the benefits of materializing its union list to all the queries in the workload, based on Equation 4. In addition, the memory cost of materializing v is the number of records in the union list of v. We choose the best union list to materialize based on their benefits and costs (sizes). Notice that materializing this list will affect the benefits of materializing other union lists on the query workload. So after deciding a node to materialize, we may need to recompute the benefits of other affected nodes. We repeat this process until we reach the given space budget B. If there is no query workload, we can use the trie structure to count the probability of each trie node to be queried and use such information to compute the benefit of materializing a node.

In summary we have disclosed how to efficiently answer top-k queries in fuzzy type-ahead search. We focused on an index structure with a trie of keywords in a data set and inverted lists of records on the trie leaf nodes. We studied two technical challenges when adopting existing top-k algorithms in the literature: how to efficiently support random access and sorted access on inverted lists? We presented two efficient algorithms for supporting random access. For sorted access, we first identified an important class of ranking functions that allow us to improve its performance by grouping the lists. We then proposed two techniques to support efficient sorted access using list pruning and materialization. We conducted an experimental consider on real data sets to show that our techniques can answer queries on large data sets efficiently.

In summary, the illustrated embodiment of the invention is a method for efficient, interactive, and fuzzy search on text data comprising the steps of: using tree-based indexes to efficiently index the data; using an algorithm to traverse the tree as the user types in a query; adaptively maintaining the intermediate results for the query to support interactive, fuzzy search; and sorting the candidate results using ranking algorithms.

The method further comprises performing query relaxation, autocompletion, or spell checking.

Where there is a single input search box, the illustrated embodiment of the invention the allows keyword queries on a plurality of data fields wherein the search is interactive, allows minor errors in the keywords, supports synonyms, and/or allows multiple keywords.

The illustrated embodiment of the invention is a method used in an information system to allow users to interactively search for text data even with minor errors.

The illustrated embodiment of the invention is a method for searching a structured data table T with m attributes and n records, where $A = \{a_1; a_2; : : : ; a_m\}$ denotes an attribute set, $R = \{r_1; r_2; : : : ; r_n\}$ denotes the record set, and $W = \{w_1; w_2; : : : ; w_p\}$ denotes a distinct word set in T, where given two words, $w_i$ and $w_j$, "$w_i \leq w_j$" denotes that $w_i$ is a prefix string of $w_j$, where a query consists of a set of prefixes $Q = \{p_1, p_2, \ldots, p_l\}$, where a predicted-word set is $W_{k_i} = \{w | w$ is a member of W and $k_i \leq w\}$, the method comprising for each prefix $p_i$ finding the set of prefixes from the data set that are similar to $p_i$, by: determining the predicted-record set $R_Q = \{r | r$ is a member of R, for every i; $1 \leq i \leq l-1$, $p_i$ appears in r, and there exists a w included in $W_{k_i}$, w appears in r$\}$; and for a keystroke that invokes query Q, returning the top-t records in $R_Q$ for a given value t, ranked by their relevancy to the query.

Where returning the top-t records in $R_Q$ for a given value t, ranked by their relevancy to the query the illustrated embodiment of the invention comprises finding a trie node corresponding to a keyword in a trie with inverted lists on leaf nodes by traversing the trie from the root; locating leaf descendants of the trie node corresponding to the keyword, and retrieving the corresponding predicted words and the predicted records on inverted lists.

Where returning the top-t records in $R_Q$ for a given value t, ranked by their relevancy to the query the illustrated embodiment of the invention comprises maintaining a session cache for each user where each session cache keeps keywords that the user has input in the past and other information for each keyword, including its corresponding trie node and the top-t predicted records.

Where maintaining a session cache for each user the illustrated embodiment of the invention comprises inputting in a query string $c_1 c_2 : : : c_x$ letter by letter, where $p_i = c_1 c_2 : : : c_i$ is a prefix query ($1 \leq i \leq x$) and where $n_i$ is the trie node corresponding to $p_i$, and after inputting in the prefix query $p_i$, storing node $n_i$ for $p_i$ and its top-t predicted records, inputting a new character $c_{x+1}$ at the end of the previous query string $c_1 c_2 : : : c_x$, determining whether node $n_x$ that has been kept for $p_x$ has a child with a label of $c_{x+1}$, if so, locating leaf descendants of node $n_{x+1}$, and retrieving corresponding predicted words and the predicted records, otherwise, there is no word that has a prefix of $p_{x+1}$, and then returning an empty answer.

The illustrated embodiment of the invention is a method further comprising modifying a previous query string arbitrarily, or copying and pasting a completely different string for a new query string, among all the keywords input by the user, identifying the cached keyword that has the longest prefix with the new query.

The illustrated embodiment of the invention is a method further where prefix queries $p_1; p_2; : : : ; p_x$ have been cached, further comprising inputting a new query $p' = c_1 c_2 : : : c_i c' : : : c_y$, finding $p_i$ that has a longest prefix with p', using node $n_i$ of $p_i$ to incrementally answer the new query p' by inserting the characters after the longest prefix of the new query c' $: : : c_y$, one by one, if there exists a cached keyword $p_i = p'$, using the cached top-t records of $p_i$ to directly answer the query p'; otherwise if there is no such cached keyword, answering the query without use of any cache.

The step of returning the top-t records in $R_Q$ for a given value t, ranked by their relevancy to the query comprises tokenizing a query string into several keywords, $k_1; k_2; : : : ,$ $k_i$; for each keyword $k_i$ ($1 \leq i \leq l-1$) determining only a predicted word, $k_l$, and one predicted-record list of a trie node corresponding to $k_l$, denoted as $l_l$, where q predicted words for $k_l$, and their corresponding predicted record lists are $l_{l1}$; $l_{l2}$; : : : ; $l_{lq}$, and determining the predicted records by $\cap_{i=1}^{l-1} I_i \cap (\cup_{j=1}^{q} I_{l_j})$ namely taking the union of the lists of predicted keywords for partial words, and intersecting the union of lists of predicted keywords for partial words with lists of the complete keywords.

The step of determining the predicted records by $\cap_{i=1}^{l-1} I_i \cap (\cup_{j=1}^{q} I_{l_j})$ comprises determining the union $I_l = \cup_{j=1}^{q} I_{l_j}$ of the predicted-record lists of the partial keyword $k_l$ to generate an ordered predicted list by using a sort-merge algorithm and then determining the intersection of several lists $\cap_{i=1}^{l} I_i$ by using a merge-join algorithm to intersect the lists, assuming these lists are pre-sorted or determining whether each record on the short lists appears in other long lists by doing a binary search or a hash-based lookup.

The step of returning the top-t records in $R_Q$ for a given value t, ranked by their relevancy to the query comprises treating every keyword as a partial keyword, namely given an input query $Q = \{k_1; k_2; : : : ; k_l\}$ for each predicted record r, for each $1 \leq i \leq l$, there exists at least one predicted word $w_i$ for $k_i$ in r, since $k_i$ must be a prefix of $w_i$, quantifying their similarity as:

$$\text{sim}(k_i; w_i) = |k_i|/|w_i|$$

if there are multiple predicted words in r for a partial keyword $k_i$ selecting the predicted word $w_i$ with the maximal similarity to $k_i$ and quantifying a weight of a predicted word to capture the importance of a predicted word, and taking into account the number of attributes that the predicted words appear in, denoted as $n_a$, to combine similarity, weight and number of attributes to generate a ranking function to score r for the query Q as follows:

$$\text{SCORE}(r, Q) = \alpha * \sum_{i=1}^{l} idf_{w_i} * sim(k_i, w_i) + (1-\alpha) * \frac{1}{\sqrt{n_a}},$$

where $\alpha$ is a tuning parameter between 0 and 1.

The method is for searching a structured data table T with the query $Q = \{k_1; k_2; : : : ; k_l\}$, where an edit distance between two strings $s_1$ and $s_2$, denoted by $ed(s_1, s_2)$, is the minimum number of edit operations of single characters needed to transform the first string $s_1$ to the second string $s_2$, and an edit-distance threshold $\delta$, for $1 \leq i \leq l$, where a predicted-word set $W_{k_i}$ for $k_i$ is $\{w | \exists w' \leq w, w \in W, ed(k_i, w') \leq \delta\}$, where a predicted-record set $R_Q$ is $\{r | r \in R, \forall 1 \leq l, \exists w_i \in W_i, w_i \text{ appears in } r\}$. The illustrated embodiment of the invention comprises determining the top-t predicted records in $R_Q$ ranked by their relevancy to Q with the edit-distance threshold $\delta$.

The step of determining the predicted-record set $R_Q$ comprises determining possible multiple words which have a prefix similar to a partial keyword, including multiple trie nodes corresponding to these words defined as the active nodes for the keyword k, locating leaf descendants of the active nodes, and determining the predicted records corresponding to these leaf nodes.

The illustrated embodiment of the invention further comprises: inputting a keyword k, storing a set of active nodes $\phi_k = \{[n, \xi_n]\}$, where n is an active node for k, and $\xi_n = ed(k; n)\delta$, inputting one more letter after k, and finding only the descendants of the active nodes of k as active nodes of the new query which comprises initializing an active-node set for an empty keyword $\epsilon$, i.e., $\phi_\epsilon = \{[n; \xi_n] | \xi_n = |n| \leq \delta\}$, namely including all trie nodes n whose corresponding string has a length $|n|$ within the edit-distance threshold $\delta$, inputting a query string $c_1 c_2 : : : c_x$ letter by letter as follows: after inputting in a prefix query $p_i = c_1 c_2 : : : c_i$ ($i \leq x$), storing an active-node set $\phi_{p_i}$ for $p_i$ when inputting a new character $c_{x+1}$ and submitting a new query $p_{x+1}$, incrementally determining the active-node set $\phi_{p_{x+1}}$ for $p_{x+1}$ by using $\phi_{p_x}$ as follows: for each $[n; \xi_n]$ in $\phi_{p_x}$, we consider whether the descendants of n are active nodes for $p_{x+1}$, for the node n, if $\xi_n + 1 < \delta$, then n is an active node for $p_{x+1}$, then storing $[n; \xi_n + 1]$ into $\phi_{p_{x+1}}$ for each child $n_c$ of node n, (1) the child node $n_c$ has a character different from $c_{x+1}$, $ed(n_s; p_{x+1}) \leq ed(n; p_x) + 1 = \xi_n + 1$, if $\xi_n$ then $n_s$ is an active node for the new string, then storing $[n_s; \xi_n + 1]$ into $\phi_{p_{x+1}}$, or (2) the child node $n_c$ has a label $c_{x+1}$ is denoted as a matching node $n_m$, $ed(n_m; p_{x+1}) \leq d(n; p_x) = \xi_n \leq \delta$, so that $n_m$ is an active node of the new string, then storing $[n_m; \xi_n]$ into $\phi_{p_{x+1}}$, but if the distance for the node $n_m$ is smaller than $\delta$, i.e., $\xi_n < \delta$, then for each $n_m$'s descendant d that is at most $\delta - \xi_n$ letters away from $n_m$, adding $[d; \xi_d]$ to the active-node set for the new string $p_{x+1}$, where $\xi_d = \xi_n + |d| - |n_m|$.

Where during storing set $\phi_{p_{x+1}}$, it is possible to add two new pairs $[v; \xi_1]$ and $[v; \xi_2]$ for the same trie node v in which case storing the one of the new pairs $[v; \xi_1]$ and $[v; \xi_2]$ for the same trie node v with the smaller edit distance.

Where given two words $w_i$ and $w_j$, their normalized edit distance is:

$$ned(w_i; w_j) = ed(w_i; w_j)/\max(|w_i|; |w_j|);$$

where $|w_i|$ denotes the length of $w_i$, where given an input keyword and one of its predicted words, the prefix of the predicted word with the minimum ned is defined as a best predicted prefix, and the corresponding normalized edit distance is defined as the "minimal normalized edit distance," denoted as "mned" and where returning the top-t records in $R_Q$ for a given value t, ranked by their relevancy to the query comprises determining if $k_i$ is a complete keyword, then using ned to quantify the similarity; otherwise, if $k_i$ is a partial keyword, then using mned to quantify their similarity, namely quantifying similarity of two words using: $sim(k_i; w_i) = \gamma*(1 - ned(k_i; w_i)) + (1-\gamma)*(1 - mned(k_i; w_i))$; where $\gamma$ is a tuning parameter between 0 and 1.

The step of returning the top-t records in $R_Q$ for a given value t, ranked by their relevancy to the query comprises among the union lists $\cup_1, \cup_2, \ldots, \cup_l$, of the leaf nodes of each prefix node identifying the shortest union list, verifying each record ID on the shortest list by checking if it exists on all the other union lists by maintaining a forward list maintained for each record r, which is a sorted list of IDs of keywords in r, denoted as $F_r$, so that each prefix $p_i$ has a range of keyword IDs $[MinId_i, MaxId_i]$, verifying whether r appears on a union list $\cup_k$ of a query prefix $p_k$ for a record r on the shortest union list by testing if $p_k$ appears in the forward list $F_r$ as a prefix by performing a binary search for $MinId_k$ on the forward list $F_r$ to get a lower bound $Id_{lb}$, and check if $Id_{lb}$ is no larger than $MaxId_k$, where the probing succeeds if the condition holds, and fails otherwise.

Where each query keyword has multiple active nodes of similar prefixes, instead of determining the union of the leaf nodes of one prefix node, the illustrated embodiment of the invention comprises determining the unions of the leaf nodes for all active nodes of a prefix keyword, estimating the lengths of these union lists to find a shortest one, for each record r on the shortest union list, for each of the other query keywords, for each of its active nodes, testing if the corresponding similar prefix appears in the record r as a prefix using the forward list of r, $F_r$.

The step of maintaining a session cache for each user comprises: caching query results and using them to answer subsequent queries; increasing the edit-distance threshold δ as a query string is getting longer in successive queries; using pagination to show query results in different pages to partially traverse the shortest list, until enough results have been obtained for a first page, continuing traversing the shortest list to determine more query results and caching them; or retrieving the top-k records according a ranking function, for a predefined constant k, verifying each record accessed in the traversal by probing the keyword range using the forward list of the record, caching records that pass verification, then when answering a query incrementally, first verifying each record in the cached result of the previous increment of the query by probing the keyword range, if the results from the cache are insufficient to compute the new top-k, resuming the traversal on the list starting from the stopping point of the previous query, until we have enough top-k results for the new query.

The illustrated embodiment of the invention is a method where for a keystroke that invokes query Q, the step of returning the top-t records in $R_Q$ for a given value t, ranked by their relevancy to the query comprises matching prefixes which includes the similarity between a query keyword and its best matching prefix; predicted keywords where different predicted keywords for the same prefix can have different weights, and record weights where different records have different weights, where a query is Q={$p_1, p_2, \ldots$}, where $p'_i$ is the best matching prefix for $p_i$, and where $k_i$ is the best predicted keyword for $p'_i$ where $sim(p_i, p'_i)$ is an edit similarity between $p'_i$ and $p_i$ and where the score of a record r for Q can be defined as:

$$\text{Score}(r, Q) = \sum_i [\text{sim}(p_i, p'_i) + \alpha * |p'_i| - |k_i|) + \beta * \text{score}(r, k_i)],$$

where α and β are weights (0<β<α<1), and score(r, $k_i$) is a score of record r for keyword $k_i$.

The illustrated embodiment of the invention is a method for fuzzy type ahead search where R is a collection of records such as the tuples in a relational table, where D is a data set of words in R, where a user inputs a keyword query letter by letter, comprising: finding on-the-fly records with keywords similar to the query keywords by using edit distance to measure the similarity between strings, where the edit distance between two strings $s_1$ and $s_2$, denoted by ed($s_1, s_2$), is the minimum number of single-character edit operations, where Q is the keyword query the user has input which is a sequence of keywords [$w_1, w_2, \ldots, w_m$]; treating the last keyword $w_m$ as a partial keyword finding the keywords in the data set that are similar to query keywords, where π is a function that quantifies the similarity between a string s and a query keyword w in D, including, but not limited to:

$\pi(s,w)=1-ed(s,w)/|w|,$ where |w| is the length of the keyword w; and normalizing the edit distance based on the query-keyword length in order to allow more errors for longer query keywords, where d be a keyword in D, for each complete keyword $w_i$ (i=1, : : : , m−1), defining the similarity of d to $w_i$ as:

$\text{Sim}(d,w_i)=\pi(d,w_i),$ since the last keyword $w_m$ is treated as a prefix condition, defining the similarity of d to $w_m$ as the maximal similarity of d's prefixes using function n, namely Sim(d, $w_m$)=max prefix p of d π(p, $w_m$), where τ is a similarity threshold, where a keyword in D is similar to a query keyword w if Sim(d, w)≥τ, where a prefix p of a keyword in D is similar to the query keyword $w_m$ if π(p, $w_m$)≥τ, where ϕ($w_i$)(i=1, : : : , m) denotes the set of keywords in D similar to $w_i$, and where P($w_m$) denotes the set of prefixes of keywords in D similar to $w_m$.

The illustrated embodiment of the invention further comprises: ranking each record r in R based on its relevance to the query, where F(;) is a ranking function that takes the query Q and a record r∈R; determining a score F(r, Q) as the relevance of the record r to the query Q, and given a positive integer k, determining the k best records in R ranked by their relevance to Q based on the score F(r, Q).

The step of determining a score F(r, Q) as the relevance of the record r to the query Q comprises determining the relevance score F(r, Q) based on the similarities of the keywords in r and those keywords in the query given that a keyword d in the record could have different prefixes with different similarities to the partial keyword $w_m$, by taking their maximal value as the overall similarity between d and $w_m$, where a keyword in record r has a weight with respect to r, such as the term frequency TF and inverse document frequency IDF of the keyword in the record.

Where the dataset D comprises a trie for the data keywords in D, where each trie node has a character label, where each keyword in D corresponds to a unique path from the root to a leaf node on the trie, where a leaf node has an inverted list of pairs [rid, weight]i, where rid is the ID of a record containing the leaf-node string, and weight is the weight of the keyword in the record, the illustrated embodiment of the invention further comprises determining the top-k answers to the query Q in two steps comprising: for each keyword $w_i$ in the query, determining the similar keywords ϕ($w_i$) and similar prefixes P($w_m$) on the trie; and accessing the inverted lists of these similar data keywords to determine the k best answers to the query.

The step of accessing the inverted lists of these similar data keywords to determine the k best answers to the query comprises randomly accessing the inverted list, in each random access, given an ID of a record r, retrieving information related to the keywords in the query Q, to determine the score F(r, Q) using a forward index in which each record has a forward list of the IDs of its keywords and their corresponding weights, where each keyword has a unique ID corresponding its leaf node on the trie, and the IDs of the keywords follow their alphabetical order.

The step of randomly accessing the inverted list comprises: maintaining for each trie node n, a keyword range [$l_n, u_n$], where $l_n$ and $u_n$ are the minimal and maximal keyword IDs of its leaf nodes, respectively; verifying whether record r contains a keyword with a prefix similar to $w_m$, where for a prefix p on the trie similar to $w_m$ checking if there is a keyword ID on the forward list of r in the keyword range [$I_p, u_p$] of the trie node of p, since the forward list of r sorted, this checking is performed a binary search using the lower bound $I_p$ on the forward list of r to get the smallest ID ° no less than $I_p$, the record having a keyword similar to $w_m$ if γ exists and is no greater than the upper bound $u_p$, i.e., γ≤·$u_p$.

The step of randomly accessing the inverted list comprises: for each prefix p similar to $w_m$, traversing the subtrie of p and identifying its leaf nodes; for each leaf node d, for the query Q, this keyword d has a prefix similar to $w_m$ in the query, storing

[Query ID,partial keyword $w_m$,sim(p,$w_m$)].

in order to differentiate the query from other queries in case multiple queries are answered concurrently; storing the similarity between $w_m$ and p; determining the score of this keyword in a candidate record, where in the case of the leaf node having several prefixes similar to $w_m$, storing their maximal similarity to $w_m$; for each keyword $w_i$ in the query, storing the same information for those trie nodes similar to $w_i$, defining stored entries for the leaf node as its collection of relevant query keywords; using collection of relevant query keywords to efficiently check if a record r contains a complete word with a prefix similar to the partial keyword $w_m$ by scanning the forward list of r, for each of its keyword IDs, locating the corresponding leaf node on the trie, and testing whether its collection of relevant query keywords includes this query and the keyword $w_m$, and if so, using the stored string similarity to determine the score of this keyword in the query.

The step of determining the score F(r, Q) comprises: for each keyword w in the query, determining a score of the keyword with respect to the record r and the query, denoted by Score(r, w, Q); and determining the score F(r, Q) by applying a monotonic function on the Score(r, w, Q)'s for all the keywords w in the query.

Where d is a keyword in record r such that d is similar to the query keyword w, d ∈φ(w), where Score(r, w, d) denotes the relevance of this query keyword w to the record keyword d, where the relevance value Score(r, w, Q) for a query keyword w in the record is the maximal value of the Score(r, w, d)'s for all the keywords d in the record, where determining a score of the keyword with respect to the record r and the query, denoted by Score(r, w, Q), the illustrated embodiment of the invention comprises finding the most relevant keyword in a record to a query keyword when computing the relevance of the query keyword to the record as an indicator of how important this record is to the user query.

The illustrated embodiment of the invention includes where F(r, Q) is $$F(r, Q) = \sum_{i=1}^{m} \text{Score}(r, w_i, Q)$$

where $$\text{Score}(r, w_i, Q) = \max_{record\ keyword\ d\ in\ r}\{\text{Score}(r, w_i, d)\}, \quad (2)(2)$$

and $$\text{Score}(r, w_i, d) = \text{Sim}(d, w_i) * \text{Weight}(d, r) \quad (3)$$

where $\text{Sim}(d, w_i)$ is the similarity between complete keyword $w_i$ and record keyword d, and Weight(d, r) is the weight of d in record r.

The embodiment further comprises partitioning the inverted lists into several groups based on their corresponding query keywords, where each query keyword w has a group of inverted lists, producing a list of record IDs sorted on their scores with respect to this keyword, and using a top-k algorithm to find the k best records for the query.

The step of using a top-k algorithm to find the k best records for the query comprises for each group of inverted lists for the query keyword w, retrieving the next most relevant record ID for w by building a max heap on the inverted lists comprising maintaining a cursor on each inverted list in the group, where the heap is comprised of the record IDs pointed by the cursors so far, sorted on the scores of the similar keywords in these records since each inverted list is already sorted based on the weights of its keyword in the records and all the records on this list share the same similarity between this keyword and the query keyword w the list is also sorted based on the scores of this keyword in these records, retrieving the next best record from this group by popping the top element from the heap, incrementing the cursor of the list of the popped element by one, and pushing the new element of this list to the heap, ignoring other lists that may produce this popped record, since their corresponding scores will no longer affect the score of this record with respect to the query keyword w.

Where $L_1, :::, L_t$ are inverted lists with the similar keywords $d_1, :::, d_t$, respectively, the illustrated embodiment of the invention further comprises sorting these inverted lists based on the similarities of their keywords to w, Sim($d_1$, w)), :::, sim($d_t$, w), constructing the max heap using the lists with the highest similarity values.

The illustrated embodiment of the invention further comprises improving sorted access by precomputing and storing the unions of some of the inverted lists on the trie, where v is a trie node, and ∪(v) is the union of the inverted lists of v's leaf nodes, sorted by their record weights, and if a record appears more than once on these lists, selecting its maximal weight as its weight on list ∪(v), where ∪(v) is defined as the union list of node v.

Where v is a trie node the illustrated embodiment of the invention comprises materializing union list ∪(v), where in using ∪(v) to speed up sorted access for the prefix keyword $w_m$ is that ∪(v) is sorted based on its record weights, where the value Score(r, $w_m$, $d_i$) of a record r on the list of a keyword $d_i$ with respect to $w_m$ is based on both Weight(di, r) and Sim(di, $w_m$), where all the leaf nodes of v have the same similarity to $w_m$, where all the leaf nodes of v are similar to $w_m$, namely their similarity to $w_m$ is no less than the threshold τ so that the sorting order of the union list ∪(v) is also the order of the scores of the records on the leaf-node lists with respect to $w_m$.

Where B is a budget of storage space available to materialize union lists comprising selecting trie nodes to materialize their union lists to maximize the performance of queries, where a node is defined as "materialized" if its union list has been materialized, where for a query Q with a prefix keyword $w_m$, some of the trie nodes have their union lists materialized, where v is the highest trie node that is usable for the max heap of $w_m$, and for which ∪(v) has not been materialized, where for each nonleaf trie descendant c of v, such that no node on the path from v to c (including c) has been materialized, the illustrated embodiment of the invention comprises: performing a cost-based analysis to quantify the benefit of materializing ∪(c) on the performance of operations on the max heap of $w_m$ based on reduction of traversal time, reduction of heap-construction time and reduction of sorted-access time, the overall benefit $B_v$ of materializing v for the query keyword query $w_m$ being:

$$B_v = B_{reduction\ of\ traversal\ time} + B_{reduction\ of\ heap-construction\ time} + A_v * B_{reduction\ of\ sorted-access\ time},$$

where $A_v$ is the number of sorted accesses on ∪(v) for each query, then summing the benefits of materializing its union list to all the queries in the query workload or trie according to probability of occurrence of the query, and recomputing $B_v$, the benefit $B_v$ of materializing other affected nodes after the benefit of each node is computed until the given budget B of storage space is realized.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 1 and 2 are screenshots produced by the method of the illustrated embodiment.

Figure 3:
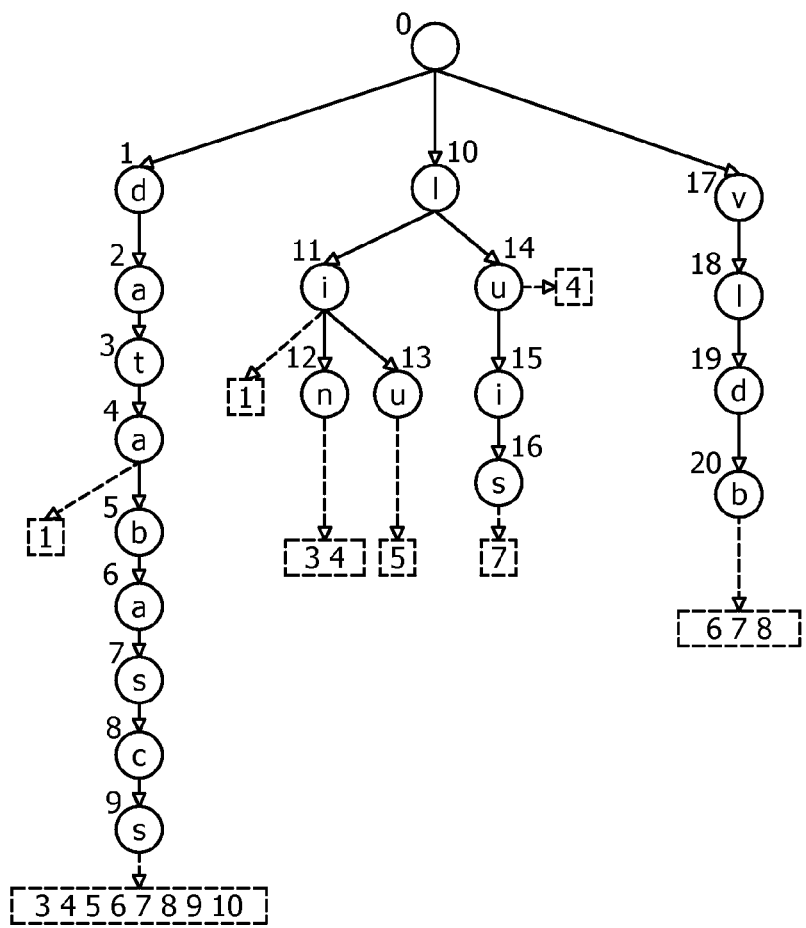
FIG. 3 is the trie on top of the words in Table I.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Introduction—iSearch

The illustrated embodiment of the invention is a computing paradigm, called "iSearch", that supports interactive, fuzzy search on structured data. It has two unique features: (1) Interactive: The system searches for the best answers "on the fly" as the user types in a keyword query; (2) Fuzzy: When searching for relevant records, the system also tries to find those records that include words that are similar to the keywords in the query, even if they do not match exactly.

We have developed several prototypes using this new paradigm. The first one, available at http://psearch.ics.uci.edu, is a system that can support search on the UCI directory. A screenshot is shown in FIG. 1. The second one, available at http://dblp.ics.uci.edu, supports search on a DBLP dataset (http//www.informatik.uni-trier.de/>>ley/db/) with more than 1 million publication records. A screenshot is shown in FIG. 2. As an example, in FIG. 1, the user has typed in a query string "professor smyt". Even though the user has not typed in the second keyword completely, the system can already find person records that might be of interests to the user. Notice that the two keywords in the query string (including a partial keyword "smyt") can appear in different attributes of the found records. In particular, in the first record, the keyword "professor" appears in the "title" attribute, and the partial keyword "smyt" appears in the "name" attribute. The matched prefixes are highlighted for the user. This feature makes this paradigm different from many autocomplete systems, which mainly deal with single-attribute data (such as a set of popular queries) and treat a query as a single-attribute string. In addition to finding records with words that match the query keywords as prefixes, the system also finds records with words that are similar to the query keywords, such as a person name "smith".

The feature of supporting fuzzy search is especially important when the user have limited knowledge about the underlying data or the entities they are looking for. As the user types in more letters, the system interactively searches on the data, and updates the list of relevant records. The system also utilizes a-priori knowledge such as synonyms. For instance, given the fact that "william" and "bill" are synonyms, the system can find a person "William Kropp" when the user has typed in "bill crop". This search prototype has been used regularly by many people at UCI, and received positive feedback due to the friendly user interface and high efficiency.

We develop solutions to these problems. We present several incremental-search algorithms for answering a query by using cached results of earlier queries. In this way, the computation of the answers to a query can spread across multiple keystrokes of the user, thus we can achieve a high speed.

Specifically, we make the following contributions. (1) We first consider the case of queries with a single key-word, and present an incremental algorithm for computing keyword prefixes similar to a prefix keyword in a query. (2) For queries with multiple keywords, we study various ways for computing the intersection of the inverted lists of query keywords, and develop an algorithm for computing the results efficiently. Its main idea is to use forward lists of keyword IDs for checking whether a record matches query keyword conditions (even approximately). (3) We develop an on-demand caching technique for incremental search. Its idea is to cache only part of the results of a query. For subsequent queries, unfinished computation will be resumed if the previously cached results are not sufficient. In this way, we can efficiently compute and cache a small amount of results. (4) We consider various features in this paradigm, such as how to rank results properly, how to highlight keywords in the results, and how to utilize domain-specific information such as synonyms to improve search. (5) In addition to deploying several real prototypes, we conducted a thorough experimental evaluation of the developed techniques on real data sets, and show the practicality of this new computing paradigm. All experiments were done using a single desktop machine, which can still achieve response times of milliseconds on millions of records.

II. iSearch of Multiple Keywords On Structured Data

We first give an example to show how iSearch works for queries with multiple keywords on structured data. Assume there is a structured table person(id; name; title; email) with information about people. The data resides on a server. A user accesses and searches the data through a Web browser. Each keystroke that the user types invokes a query, which includes the current string the user has typed in. The browser sends the query to the server, which computes and returns to the user the best answers ranked by their relevancy to the query. If the user clicks the "search" button on the interface, the browser sends the query to the server, which answers the query in the same way as traditional keyword-search methods. For example, suppose a user searches for a professor called "smyth", and types in a query "professor smyt" letter by letter, as illustrated in FIG. 1. The string is tokenized to keywords using delimiters such as the space character. The keywords (except the last one) such as "professor", have been typed in completely. The last keyword is a partial keyword, such as "smyt", as the user may have not finished typing the complete keyword.

For the partial keyword, we would like to know the possible word the user intends to type. However, given the limited information, we can only identify a set of words in the data set with this partial keyword as a prefix. This set of keywords are called the predicted words of the partial keyword. For instance, for the partial keyword "smyt", its predicted words are "smyth", "smytha", etc. We retrieve the records that contain all the complete keywords and at least one of the predicted words of the partial keyword. We call these records the predicted records of the query. FIG. 1 shows four predicted records. In this way, iSearch can save users time and efforts, since they can find the answers even if they have not finished typing all the complete keywords. There are two challenges in this context. The first one is how to interactively and incrementally identify the predicted words after each keystroke from the user. The second one is how to efficiently compute the predicted records of a query with multiple keywords, especially when there are many such records.

Problem Formulation

We formalize the problem of interactive, fuzzy search on a relational table, and our method can be adapted to textual documents, XML, and databases with multiple tables. We first formalize the iSearch problem as follows. Consider a structured data table T with m attributes and n records. Let $A=\{a_1, a_2; :::; a_m\}$ denote the attribute set, $R=\{r_1; r_2; :::; r_n\}$ denote the record set, and $W=\{w_1; w_2; :::; w_p\}$ denote the distinct word set in T. Given two words, $w_i$ and $w_j$, "$w_i \leq w_j$" denotes that $w_i$ is a prefix string of $w_j$. For example, consider the publication table shown in Table I. It has 10 records and 5 attributes. We have "lu"≤"luis".

A query consists of a set of prefixes $Q=\{p_1, p_2, \ldots, p_l\}$. For each prefix $p_j$, we want to find the set of prefixes from the data set that are similar to $p_j$. Clearly the technique can be used to answer queries when only the last keyword is treated as a partial prefix, and the other are treated as completed words. In this work we use edit distance to measure the similarity between two strings $s_1$ and $s_2$, denoted by $ed(s_1, s_2)$, is the minimum number of edit operations (i.e., insertion, deletion, and substitution) of single characters needed to transform the first one to the second. For example, ed(smith, smyth)=1.

Definition 1: (The iSearch Problem) Given a table T and a query $Q=\{k_1; k_2; :::; k_l\}$ where $k_l$ is the last partial keyword, let predicted-word set be $W_{kl}=\{s|w$ is a member of W and $k_l \leq w\}$. We want to compute the predicted-record set $R_Q=\{r|r$ is a member of R, for every i; $1 \leq i \leq l-1$, $k_i$ appears in r, and there exists a w included in $W_{kl}$, w appears in r}. For the keystroke that invokes query Q, we return the top-t records in $R_Q$ for a given value t, ranked by their relevancy to the query.

We treat the data and query string as lower-case strings. We will focus on how to find the predicted records, among which we can find the best answers using a ranking function. A variety of ranking functions can be used, as discussed below. We use a trie to index the words in the table. Each word w in the table corresponds to a unique path from the root of the trie to a leaf node. Each node on the path has a label of a character in w. For simplicity, we use a node and its corresponding string interchangeably. For each leaf node, we store an inverted list of IDs of records that contain the word of the leaf node. For instance, for the publication table in Table I, its trie for the tokenized words is shown in FIG. 3. The word "luis" has a node ID of 16, and its inverted list includes record 7, which contains the word.

Alternatively, problem formulation can begin with a definition for an Interactive Fuzzy Search.

Definition 1 (Interactive Fuzzy Search).

Given a set of records R, let W be the set of words in R. Consider a query $Q=\{p_1, p_2, \ldots, p_l\}$ and an edit-distance threshold $\delta$. For each $p_i$, let $P_i$ be $\{p'_i | \exists w \in W, p' \leq w$ and $ed(p'_i, p_i) \leq \delta\}$. Let the set of candidate records $R_Q$ be $\{r|r \in R, \forall 1 \leq i \leq l \exists p'_i \in P_i$ and $w_i$ appears in r, $p'_i \leq w_i\}$. The problem is to compute the best records in $R_Q$ ranked by their relevancy to Q. These records are computed incrementally as the user modifies the query, e.g., by typing in more letters.

Figure 6:
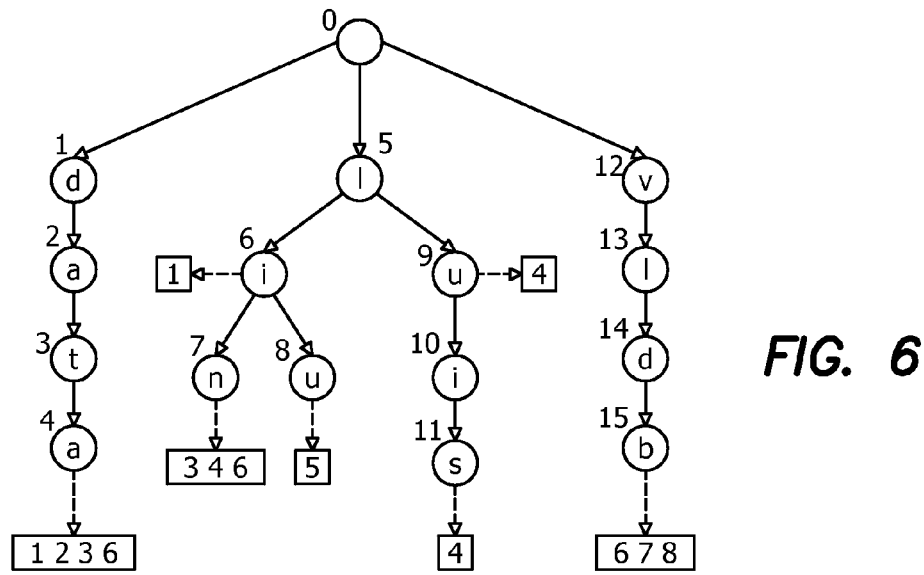
FIG. 6 is a trie with inverted lists at the leaf nodes.

Indexing:

We use a trie to index the words in the relational table. Each word w in the table corresponds to a unique path from the root of the trie to a leaf node. Each node on the path has a label of a character in w. For simplicity, a node is mentioned interchangeably with its corresponding string in later text. Each leaf node has an inverted list of IDs of records that contain the corresponding word, with additional information such as the attribute in which the keyword appears and its position. For instance, FIG. 6 shows a partial index structure for publication records. The word "vldb" has a trie node ID of 15, and its inverted list includes record IDs 6, 7, and 8. For simplicity, the figure only shows the record ids, without showing the additional information about attributes and positions.

B. Single Keyword

We first consider how to answer a query with a single keyword using the trie. Each keystroke that a user types invokes a query of the current keyword, and the client browser sends the query to the server.

Naive Method:

One naive way to process such a query on the server is to answer the query from scratch as follows. We first find the trie node corresponding to this keyword by traversing the trie from the root. Then we locate the leaf descendants of this node, and retrieve the corresponding predicted words and the predicted records on the inverted lists. For example, suppose a user types in query string "luis" letter by letter. When the user types in the character "l", the client sends the query "l" to the server. The server finds the trie node corresponding to this keyword, i.e., node 10. Then it locates the leaf descendants of node 10, i.e., nodes 11, 12, 13, 14, and 16, and retrieves the corresponding predicted words, i.e., "li", "lin", "liu", "lu", and "luis", and the predicted records, i.e., 1, 3, 4, 5, and 7. When the user types in the character "u", the client sends a query string "lu" to the server. The server answers the query from scratch as follows. It first finds node 14 for this string, then locates the leaf descendants of node 14 (nodes 14 and 16). It retrieves the corresponding predicted words ("lu" and "luis"), and computes the predicted records (4 and 7). Other queries invoked by keystrokes are processed in a similar way.

One main limitation of this method is that it involves a lot of recomputation without using the results of earlier queries.

2) Caching-Based Method:

We maintain a session for each user. Each session keeps the keywords that the user has typed in the past and other information for each keyword, including its corresponding trie node and the top-t predicted records. The goal of keeping the information is to use it answer subsequent queries incrementally as follows. Assume a user has typed in a query string $c_1 c_2 : : : c_x$ letter by letter. Let $p_i = c_1 c_2 : : : c_i$ be a prefix query ($1 \le i \le x$). Suppose $n_i$ is the trie node corresponding to $p_i$. After the user types in a prefix query $p_i$ we store node $n_i$ for $p_i$ and its top-t predicted records.

For example, suppose a user has typed in "lui". After this query is submitted, the server has stored node 10 and records 1, 3, 4, 5, and 7 (only top-t) for the prefix query "l", node 14 and records 4 and 7 for the prefix query "lu", and node 15 and record 7 for "lui". For each keystroke the user types, for simplicity, we first assume that the user types in a new character $c_{x+1}$ at the end of the previous query string. To incrementally answer the new query, we first check whether node $n_x$ that has been kept for $p_x$ has a child with a label of $c_{x+1}$. If so, we locate the leaf descendants of node $n_{x+1}$, and retrieve the corresponding predicted words and the predicted records. Otherwise, there is no word that has a prefix of $p_{x+1}$, and we can just return an empty answer. For example, if the user types in "s", we check whether node 15 kept for "lui" has a child with label "s". Here, we find node 16, and retrieve the predicted word "luis" and the predicted record 7.

In general, the user may modify the previous query string arbitrarily, or copy and paste a completely different string. In this case, for the new query string, among all the keywords typed by the user, we identify the cached keyword that has the longest prefix with the new query. Formally, consider a query string $c_1 c_2 : : : c_x$. Suppose we have cached prefix queries $p_1$; $P_2$; : : : ; $P_x$. Suppose the user submits a new query $p' = c_1 c_2 : : : c_i c' : : : c_y$. We find $p_i$ that has a longest prefix with p'. Then we use the node $n_i$ of $p_i$ to incrementally answer the new query p', by inserting the characters after the longest prefix of the new query c' : : : $c_y$ one by one. In particular, if there exists a cached keyword $p_i$=p', we use the cached top-t records of $p_i$ to directly answer the query p'; If there is no such cached keyword, we answer the query from scratch.

C. Multiple Keywords

Now we consider how to do interactively search in the case of a query with multiple keywords. For a keystroke that invokes a query, we first tokenize the query string into several keywords, $k_2$; : : : ; $k_1$. For each keyword $k_i$ ($1 \le i \le l-1$), since it is treated as a complete keyword, we consider only predicted word (i.e., $k_i$), and one predicted-record list (i.e., the inverted list of the trie node corresponding to $k_i$, denoted as $l_i$). For the partial keyword $k_l$, there can be multiple predicted words and multiple predicted-record lists. Suppose there are q predicted words for $k_l$, and their corresponding predicted record lists are $l_{l1}$; $l_{l2}$; : : : ; $l_{lq}$. Note that the predicted-record lists of complete keywords can be retrieved based on the cached nodes of the complete keywords. The predicted-record lists of the partial keyword can be computed as discussed before. Now our problem is to compute the predicted records as $\cap_{i=1}^{l-1} I_i \cap (\cup_{j=1}^{q} I_{l_j})$. Conceptually, we take the union of the lists of predicted keywords for the partial word, and do an intersection of this union list with the lists of the complete keywords. We illustrate this operation using the following example.

Example 2

Assume a user types in a query "databases vldb luis" letter by letter. We use Table II to illustrate how our method works. As the user types in the keyword "databases", for each keystroke, we incrementally answer the query as discussed before. When the user types in a space, we assume that the user has completely typed in the keyword "databases". When the user types in "v", we find the trie node 17. We identify the predicted word "vldb" and the predicted records 6, 7, and 8. We compute the intersection of the predicted records of "databases" and those of "v", and get the predicted records of the current query (records 6, 7, and 8). Similarly, we can incrementally answer the query "databases vldb". When the user types in another space, we assume that "vldb" has been typed in completely. When the user types in "lu", there are two predicted words ("lu" and "luis"). We first compute the union of the record lists of the two predicted words, and get an ordered predicted-record list {4, 7}. The predicted-record list for "databases" is {3, 4, 5, 6, 7, 8, 9, 10}; and that of "vldb" is {6, 7, 8}. We intersect the three lists and get the final predicted record (7).

In general, we first compute the union $I_l = \cup_{j=1}^{q} I_{l_j}$ of the predicted-record lists of the partial keyword $k_l$ to generate an ordered predicted list by using a sort-merge algorithm. Then, we compute the intersection of several lists $\cap_{i=l}^{l} I_i$. If the sizes of these inverted lists are large, it is expensive to compute the predicted records. Various algorithms can be adopted here. Specifically we consider two methods. One way is to use a merge-join algorithm to intersect the lists, assuming these lists are pre-sorted. Another way is to check whether each record on the short lists appears in other long lists by doing a binary search or a hash-based lookup. The second method has been shown to achieve a high performance.

D. Treating Every Keyword as a Partial Keyword

In most cases, when a user types in a space character, the user may not modify the keywords before the space. Thus we can treat them as complete keywords. In some cases, the user may modify them to refine the answer, or may input partial keywords due to their limited knowledge, such as "pad smyt" for "padhraic smyth". To address this issue, we can treat every input keyword as a partial keyword. We can answer the query in a similar manner. We identify the predicted words and predicted records for every partial keyword as discussed above, and compute the predicted records of the query as discussed before. Note that give a query $Q = \{k_1; k_2; : : : ; k_l\}$, for each keyword, there could be multiple predicted-record lists. Suppose there are $q_i$ predicted record lists for the keyword $k_i$, denoted as $I_{i_1}; I_{i_2}; : : : ; I_{i_{q_i}}$. We compute the predicted records as $\cap_{i=1}^{q} I_{l_i}$). We can easily extend the algorithms discussed above to compute this intersection.

E. Ranking Predicted Records

We want to return a smaller number of relevant records for reasons such as limited interfaces on the client. A variety of ranking functions can be used to rank the predicted records. Here, we consider a specific ranking function by utilizing the fact that every keyword can be treated as a partial keyword, which is quite different from search interfaces that treat every input keyword as a complete keyword.

Given an input query $Q = \{k_1; k_2; : : : ; k_l\}$, for each predicted record r, for each $1 \le i \le l$, there exists at least one predicted word $w_i$ for $k_i$ in r. Since $k_i$ must be a prefix of $w_i$, we can quantify their similarity as:

$$\text{sim}(k_i; w_i) = |k_i|/|w_i|: \tag{1}$$

If there are multiple predicted words in r for a partial keyword $k_i$, we select the predicted word $w_i$ with the maximal similarity to $k_i$. We also consider the weight of a predicted word to capture the importance of a predicted word in the data. For example, we can use the inverse document frequency of a keyword $w_i$ to quantify its weight, denoted as $idf_{w_i}$. In addition, we take into account the number of attributes that the/predicted words appear in, denoted as $n_a$. Accordingly, by combining these three parameters, we propose a ranking function to score r for the query Q as follows:

$$\text{SCORE}(r, Q) = \alpha * \sum_{i=1}^{l} idf_{w_i} * sim(k_i, w_i) + (1-\alpha) * \frac{1}{\sqrt{n_a}}, \quad (2)$$

where α is a tuning parameter between 0 and 1.

Highlighting:

When a user types in some keywords, as we treat every keyword as a partial keyword, we want to highlight the predicted words of each keyword. We highlight the prefix of the predicted word that the user has typed. For example, for the input keyword "lu" and its predicted word "luis", we highlight it as "luis". To efficiently highlight a predicted word, we need to store the information (on the inverted list) about in which attribute the word appears, and the offset of the word in the attribute, in addition to the record ID. For example, in FIG. 3, for node 16 with respect to the string "luis", on its inverted list, we need to keep its record ID (7), attribute ID (3), and offset in the attribute (20). (For simplicity, we only show record IDs in the figures.)

Synonyms:

We can utilize a-priori knowledge about synonyms to find relevant records. For example, "William=Bill" is a common synonym in the domain of person names. Suppose in the underlying data, there is a person called "Bill Gates". If a user types in "William Gates", we can also find this person. To this end, on the trie, the node corresponding to "Bill" has a link to the node corresponding to "William", and vice versa. When a user types in "Bill", in addition to retrieving the predicted records for "Bill", we also identify those of "William" following the link. In this way, our method can be easily extended to utilize synonyms.

iSearch With Fuzzy Search

Suppose a user wants to search for papers written by Christos Faloutsos. The user does not know the exact spelling, and types in "chritos felouts" as illustrated in FIG. 2. iSearch can still find relevant answers; we predict "christos" for "chritos" and "faloutsos" for "flotsos", and retrieve top-t relevant records. iSearch with fuzzy search is appealing especially since even if the user types in a query with minor errors due to limited knowledge, the system can still find the answers that could be of interests to the user. A big challenge is how to incrementally and efficiently identify the predicted words that are similar to the input keywords. We develop an efficient algorithm to solve this problem.

Problem Formulation

We first extend the problem formulation above to support a fuzzy search. We treat every input keyword in a given query as a partial keyword. For each keyword, we identify its predicted words that have a prefix similar to the keyword within a given threshold, and retrieve the predicted records that contain a predicted word for every keyword. We use edit distance to quantify the similarity between two words $w_i$ and $w_j$, denoted as $ed(w_i, w_j)$. The edit distance between two strings is the minimum number of edit operations (i.e., insertion, deletion, and substitution) of single characters needed to transform the first one to the second. For example, ed(chritos, christos)=1 and ed(felouts, faloutsos)=3.

Definition 2: (FUZZY SEARCH)

Given a table T, a query $Q=\{k_1; k_2; : : : ; k_l\}$ and an edit-distance threshold δ, for 1≤i≤l, let the predicted-word set $W_{k_i}$ for $k_i$ be $\{w | \exists w' w, w \in W, ed(k_i, w') \leq \delta\}$. Let the predicted-record set $R_Q$ be $\{r | r \in R, \forall 1 \leq i \leq l, \exists w_i \in W_i, w_i \text{ appears in } r\}$. We want to compute the top-t predicted records in $R_Q$ ranked by their relevancy to Q.

For simplicity, we assume we are given threshold δ on the edit distance between similar strings. We can easily extend our solution by dynamically increasing the threshold δ for longer keywords.

B. Single Keyword

In the case of exact search, there exists only one trie node corresponding to a partial keyword k. We use this node to identify the predicted words as discussed above. However, to support fuzzy search, we need to predict the possible multiple words which have a prefix similar to the partial keyword. Thus, there may exist multiple trie nodes corresponding to these words. We call these nodes the active nodes for the keyword k. We locate the leaf descendants of the active nodes, and compute the predicted records corresponding to these leaf nodes. For example, consider the trie in FIG. 4. Suppose δ=2, and a user types in a partial keyword "nlis". The words "li", "lin", "liu", and "luis", are all similar to the input keyword, since their edit distances to "nlis" is within δ=2. Thus nodes 11, 12, 13, and 16 are active nodes for the partial keyword (FIG. 4(e)). We find the leaf descendants of the active nodes as the predicted words ("li", "lin", "liu", and "luis").

Now we consider how to incrementally compute active nodes for query strings as the user types in letters. We develop a caching-based method to achieve our goal. Given an input keyword k, different from exact search which keeps only one trie node, we store the set of active nodes $\phi_k = \{[n, \xi_n]\}$, where n is an active node for k, and $\xi_n = ed(k; n) \leq \delta$. (Notice that for simplicity, we use "n" to represent both the trie node and its corresponding string.) We call $\phi_k$ the active node set for the keyword k (together with the edit-distance information for each active node). The idea behind our method is to use the prefix-filtering. That is, when the user types in one more letter after k, only the descendants of the active nodes of k could be active nodes of the new query, and we need not consider other trie nodes. We use this property to incrementally compute the active-node set of a new query.

For a new query, we will use the cached active-node sets to incrementally compute a new active-node set for the query as follows. Firstly, we initialize an active-node set for the empty keyword E, i.e., $\phi_\epsilon = \{[n; \xi_n] | \xi_n = |n| \leq \delta\}$. That is, it includes all trie nodes n whose corresponding string has a length |n| within the edit-distance threshold δ. These nodes are active nodes for the empty string since their edit distances to ϵ are within δ.

Figure 5:
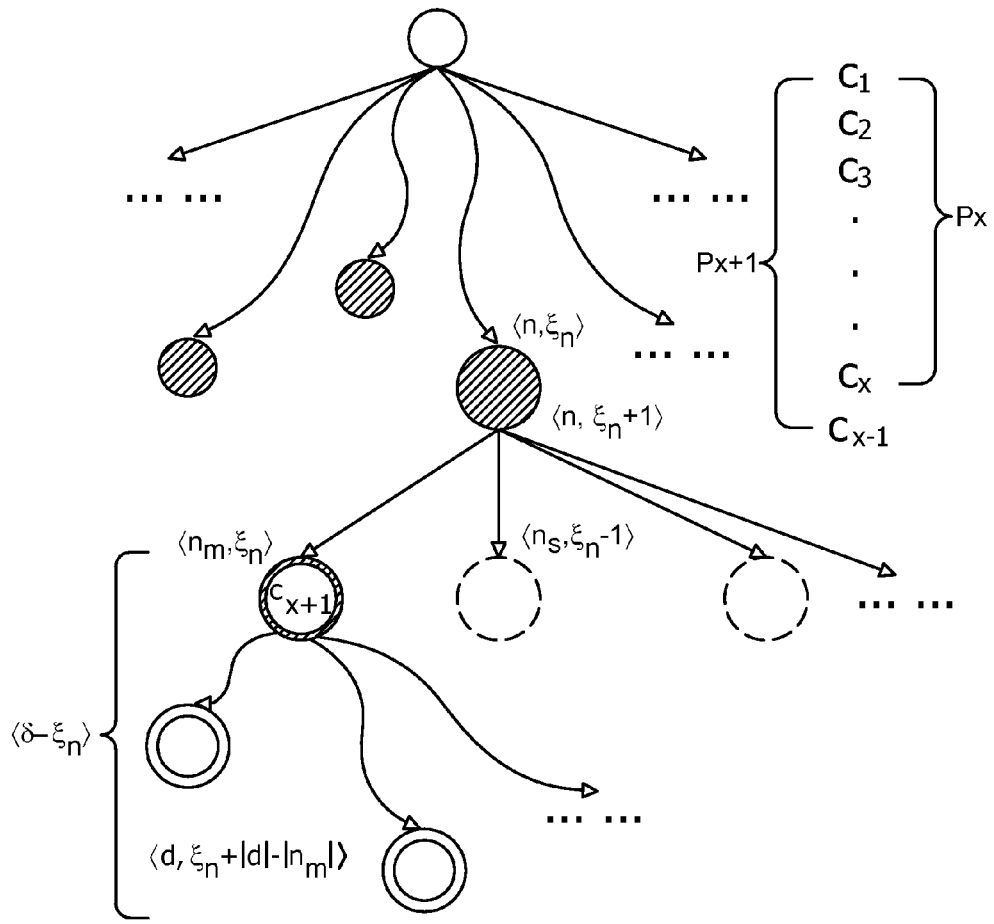
FIG. 5 is a diagram depicting the computation of active node set $\emptyset_{p_{x+1}}$ from the active node set $\emptyset_{p_x}$. We consider an active $[n, \xi_n]$ in $\emptyset_{p_x}$.

Assume a user has typed in a query string $c_1 c_2 : : : c_x$ letter by letter. After the user types in a prefix query $p_i = c_1 c_2 : : : c_i$ (i≤x), we keep an active-node set $\phi_{p_i}$ for $p_i$. When the user types in a new character $c_{x+1}$ and submits a new query $p_{x+1}$, we compute the active-node set $\phi_{p_{x+1}}$ for $p_{x+1}$ by using $\phi_{p_x}$ as follows. For each $[n; \xi_n]$ in $\phi_{p_x}$, we consider whether the descendants of n are active nodes for $p_{x+1}$, as illustrated in FIG. 5. For the node n, if $\xi_n + 1 < \delta$, then n is an active node for $p_{x+1}$, so we include $[n; \xi_n + 1]$ into $\phi_{p_{x+1}}$. This case corresponds to deleting the last character $c_{x+1}$ from the new query string $p_{x+1}$. Notice that even if $\xi_n + 1 \leq \delta$· is not true, this node n could still potentially become an active node of the new query string, due to operations described below on other active nodes in $\phi_{p_x}$.

For each child $n_c$ of node n, it has two possible cases.

The child node $n_c$ has a character different from $c_{x+1}$. FIG. 5 shows a node $n_s$ for such a child node, where "s" stands for "substitution," the meaning of which will become clear shortly. We have ed($n_s$; $p_{x+1}$)≤ed($n$; $p_x$)+1=$\xi_n$+1. If $\xi_n$+1≤δ, then $n_s$ is an active node for the new string, so we put [$n_s$; $\xi_n$+1] into $\varnothing_{p_{x+1}}$. This case corresponds to substituting the label of $n_s$ for the letter $c_{x+1}$.

The child node $n_c$ has a label $c_{x+1}$. FIG. 5 shows the node $n_m$ for such a child node, where "m" stands for "matching," the meaning of which will become clear shortly. In this case, we have ed($n_m$; $p_{x+1}$)≤·ed($n$; $p_x$)=$\xi_n$≤δ. Thus, $n_m$ is an active node of the new string, so we put [$n_m$; $\xi_n$] into $\varnothing_{p_{x+1}}$. This case corresponds to the match between the character $c_{x+1}$ and the label of $n_m$. One subtlety here is that, if the distance for the node $n_m$ is smaller than δ, i.e., $\xi_n$<δ, we need to do the following: for each $n_m$'s descendant d that is at most δ-$\xi_n$ letters away from $n_m$, we can safely add [d; $\xi_n$] to the active-node set for the new string $p_{x+1}$, where $\xi_d$=$\xi_n$+|d|−|$n_m$|. This operation corresponds to inserting several letters after node $n_m$. For the node $n_s$ we need not consider its descendants for insertions. Because if these descendants are active nodes, they must be in $\varnothing_{p_x}$, and we will consider them when processing such active nodes.

Notice that during the computation of set $\varnothing_{p_{x+1}}$, it is possible to add two new pairs [v; $\xi_1$] and [v; $\xi_2$] for the same trie node v. In this case, we always keep the one with the smaller edit distance. That is, if $\xi_1$<$\xi_2$, we only keep the former pair. The reason is that we only want to keep the edit distance between the node v and the query string $p_{x+1}$, which means the minimum number of edit operations to transform the string of v to the string $p_{x+1}$. The following lemma shows the correctness of this algorithm, which can be proved by mathematical induction. Here, we omit the proof.

Lemma 1:

For a query string $p_x$=$c_1c_2$ : : : $c_x$, let $\varnothing_{p_x}$ be its active-node set. Consider a new query string $p_{x+1}$=$c_1c_2$ : : : $c_xc_{x+1}$. (1) Soundness: Each node computed by the algorithm described above is an active node of the new query string $p_{x+1}$. (2) Completeness: Every active node of the new query string $p_{x+1}$ will be computed by the algorithm above.

Example 3

Figure 4:
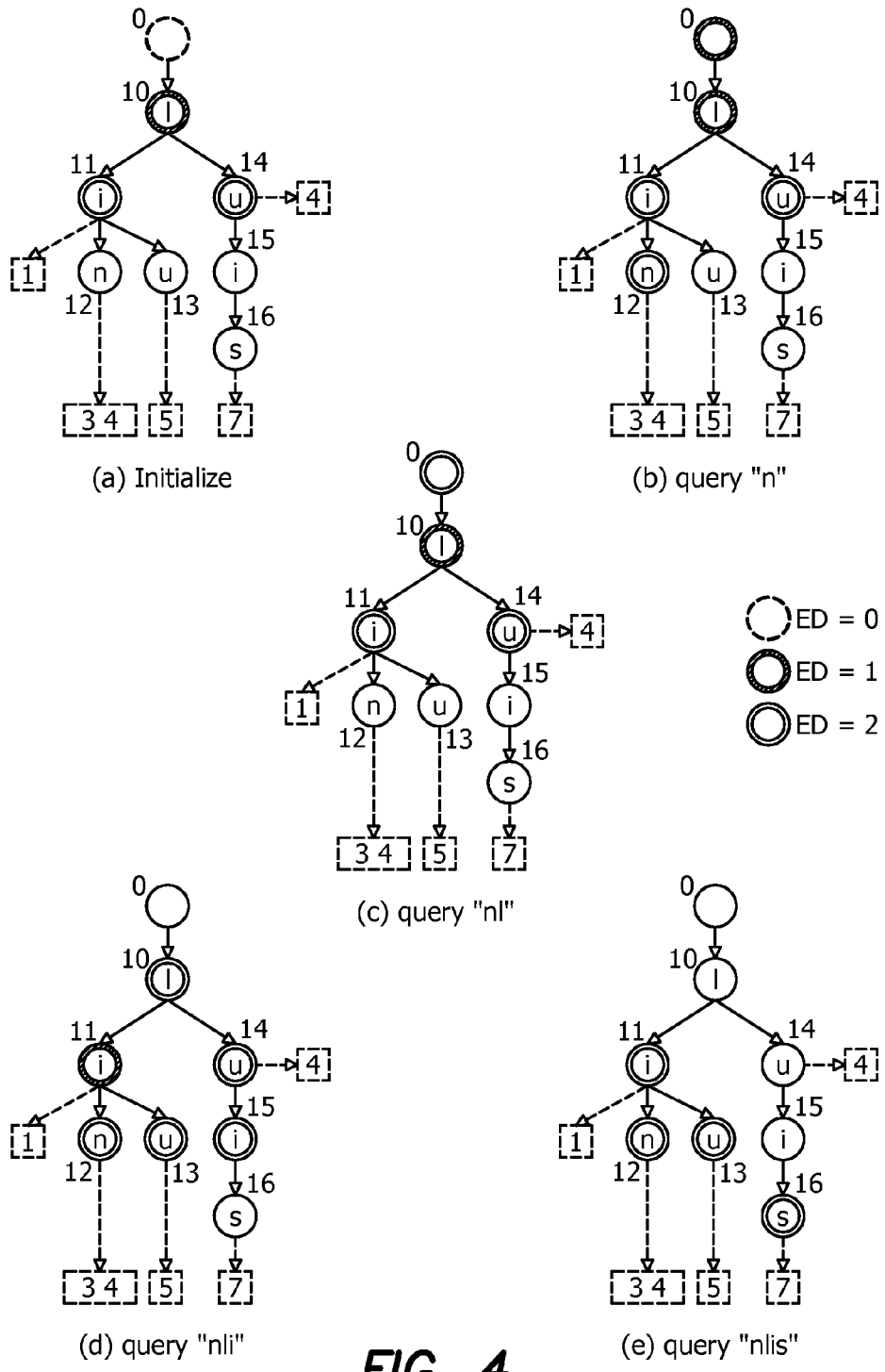
FIGS. 4a-4e (also referenced collectively as FIG. 4) is a sequence of trie diagrams showing the execution of fuzzy search for processing prefix queries of "nlis" (edit distance threshold $\delta=2$).

Assume a user types in a query "nlis" letter by letter. Suppose the edit-distance threshold δ is 2. FIG. 4 illustrates how our method works to process the prefix queries invoked by keystrokes. Table III shows the details of how to compute the active-node sets incrementally. Firstly, we initialize $\phi_\epsilon$= {[0,0], [10,1], [11,2], [14,2]} (FIG. 4a and Table III (a)). When the user types in the first character "n", for the string s="n", we compute its active-node set $\phi_s$ based on $\phi_\epsilon$ as follows. For [0; 0]∈$\phi_\epsilon$, we put [0; 1] into $\phi_s$, since we can delete the letter "n". For node 10, which is a child of node 0 with a letter "l", we put [10; 1] into $\phi_s$, as we can substitute "l" for "n". There are no match and insertion operations as node 1 has no child with label "n". In this way, we get $\phi_s$ (FIG. 4b and Table III (b)). Similarly, we can answer the prefix queries of "nlis".

For each active node, we predict the words corresponding to its leaf descendants. Consider the active-node set for the prefix query "nl" as shown in FIG. 4c. For [11; 2], we compute the predicted words of "li, "lin", and "liu", and the predicted records of 1, 3, 4, and 5.

C. Multiple Keywords
iSearch

Now we consider how to do fuzzy search in the case of a query with multiple keywords first in the context of using iSearch. Second, we will consider below a fuzzy search with multiple keywords using intersection of multiple lists of keywords and then cache-based incremental intersection.

For each keystroke, we first tokenize the query string into several keywords. Then we identify the predicted words and predicted records of each keyword as discussed before. Different from the case of exact search, in fuzzy search, there could be multiple active nodes for each partial keyword, instead of only one trie node in exact search. For example, in FIG. 4d, suppose a user types in a query "nli". The active nodes are 10, 11, 12, 13, 14, and 15. The predicted words are "li", "lin", "liu", "lu", and "lui". There are multiple active nodes for each keyword. We need to combine the predicted records for every active node, and generate an ordered list for the keyword. Then we can use the algorithms described above to compute the predicted records for the query.

Discussions

Highlighting:

We extend the highlighting method discussed above to support fuzzy search. It is relatively easy to highlight the predicted word in exact search, as the input keyword must be a prefix of the predicted word. However it is not straightforward to highlight predicted words in fuzzy search. This is because, given an input keyword and one of its predicted words, the input keyword may not be a prefix of the predicted word. Instead, the input keyword may be similar to some prefixes of the predicted word. Thus, there could be multiple ways to highlight the predicted word. For example, suppose a user types in "lus", and there is a predicted word "luis". Both prefixes "lui" and "luis" are similar to "lus", and there are several ways to highlight the predicted word, such as "luis" or "luis". To address this issue, we use the concept normalized edit distance (ned for short).

Definition 3: (Normalized Edit Distance)

Given two words $w_i$ and $w_j$, their normalized edit distance is:

$$\text{ned}(w_i;w_j)=\text{ed}(w_i,w_j)/\max(|w_i|;|w_j|);  \quad (3)$$

where |$w_i$| denotes the length of $w_i$. Given an input keyword and one of its predicted words, we highlight the prefix of the predicted word with the minimum ned to the keyword. We call such a prefix a best predicted prefix, and call the corresponding normalized edit distance the "minimal normalized edit distance," denoted as "mned". This prefix is considered to be most similar to the input keyword. For example, for the keyword "lus" and its predicted word "luis", we have ned ("lus", "l")=2 3, ned("lus", "lu")=1 3, ned("lus", "lui")=1 3, and ned("lus", "luis")=1 4. Since mned("lus", "luis")=ned ("lus", "luis"), we highlight "luis".

2) Ranking:

As before, a variety of ranking functions can be used to rank the predicted records. Here, we consider a specific ranking function by utilizing the fact that input keywords may be fuzzy. Consider an input keyword $k_i$ and one of its predicted words, $w_i$. As $k_i$ may not be a prefix of $w_i$, but similar to a prefix of $w_i$, then |$k_i$|/|$w_i$| may not accurately quantify the similarity between $k_i$ and $w_i$. If $k_i$ is a complete keyword, ned can quantify the similarity; otherwise, if $k_i$ is a partial keyword, mned is a better function to quantify their similarity. We combine the two functions to quantify their similarity as follows:

$$\text{sim}(k_i;w_i)=\gamma*(1-\text{ned}(k_i;w_i))+(1-\gamma)*(1-m\text{ned}(k_i;w_i));  \quad (4)$$

where γ is a tuning parameter between 0 and 1. Accordingly, we can extend the ranking function Equation 2 using this similarity function to rank records in fuzzy search.

In summary, we disclose a computing paradigm, called iSearch, that supports interactive, fuzzy search on structured data. We have developed several novel techniques to interactively and efficiently search the underlying data on the-fly. We also considered how to support fuzzy search in the framework, by using a prefix-filtering-based method to incrementally identify related keywords. We have developed several prototypes on real applications. The experimental results show that our methods can achieve a high search efficiency and result quality.

Now consider a fuzzy search using multiple keywords more outside the limited context of iSearch. The goal is to efficiently and incrementally compute the records with keywords whose prefixes are similar to those query keywords. We focus on several challenges in this setting.

Intersection of Multiple Lists of Keywords:

Each query keyword (treated as a prefix) has multiple predicted complete keywords, and the union of the lists of these predicted keywords includes potential answers. The union lists of multiple query keywords need to be intersected in order to compute the answers to the query. These operations can be computationally costly, especially when each query keyword can have multiple similar prefixes. We consider various algorithms for computing the answers efficiently.

(2) Cache Based Incremental Intersection:

In most cases, the user types the query letter by letter, and subsequent queries append additional letters to previous ones. Based on this observation, we consider how to use the cached results of earlier queries to answer a query incrementally Intersecting Union Lists of Prefixes For simplicity, we first consider exact search, and then extend the results to fuzzy search. Given a query $Q=\{p_1, p_2, \ldots, p_r\}$, suppose $\{k_{i_1}, k_{i_2}, \ldots\}$ is the set of keywords that share the prefix $p_i$. Let $L_{i_j}$ denote the inverted list of $k_{i_j}$ and $\cup_i = \cup_j L_{i_j}$ be the union of the lists for $p_i$. We study how to compute the answer to the query, i.e., $\cap_i \cup_i$.

Simple Methods:

One method is the following. For each prefix $p_i$, we compute the corresponding union list $\cup_i$ on the fly and intersect the union lists of different keywords. The time complexity for computing the unions could be $$O\left(\sum_{i,j} L_{i_j}\right).$$

The shorter the keyword prefix is, the slower the query could be, as inverted lists of more predicted keywords need to be traversed to generate the union list. This approach only requires the inverted lists of trie leaf nodes, and the space complexity of the inverted lists is $O(n \times L)$, where n is the number of records and L is the average number of distinct keywords of each record.

Alternatively, we can pre-compute and store the union list of each prefix, and intersect the union lists of query keywords when a query comes. The main issue of this approach is that the precomputed union lists require a large amount of space, especially since each record occurrence on an inverted list needs to be stored many times. The space complexity of all the union lists is $O(n \times L \times w)$, where w is the average keyword length. Compression techniques can be used to reduce the space requirement.

Efficient Prefix Intersection Using Forward Lists:

We develop a new solution based on the following ideas. Among the union lists $\cup_1, \cup_2, \ldots, \cup_l$, we identify the shortest union list. Each record ID on the shortest list is verified by checking if it exists on all the other union lists (following the ascending order of their lengths). Notice that these union lists are not materialized in the computation. The shortest union list can be traversed by accessing the leaf nodes of the corresponding prefix. The length of each union list can be precomputed and stored in the trie, or estimated on-the-fly. To verify record occurrences efficiently, a forward list can be maintained for each record r, which is a sorted list of IDs of keywords in r, denoted as $F_r$. A unique property of the keyword IDs is that they are encoded using their alphabetical order. Therefore, each prefix pi has a range of keyword IDs [$MinId_i$, $MaxId_i$], so that if $p_i$ is a prefix of another string s, then the ID of s should be within this range.

An interesting observation is, for a record r on the shortest union list, the problem of verifying whether r appears on (non-materialized) union list $\cup_k$ of a query prefix $p_k$, is equivalent to testing if $p_k$ appears in the forward list $F_r$ as a prefix. We can do a binary search for $MinId_k$ on the forward list $F_r$ to get a lower bound $Id_{lb}$, and check if $Id_{lb}$ is no larger than $MaxId_k$. The probing succeeds if the condition holds, and fails otherwise. The time complexity for processing each single record r is $O[(l-1)\log L]$, where l is the number of keywords in the query, and L is the average number of distinct keywords in each record. A good property of this approach is that the time complexity of each probing does not depend on the lengths of inverted lists, but on the number of unique keywords in a record (logarithmically).

Figure 7:
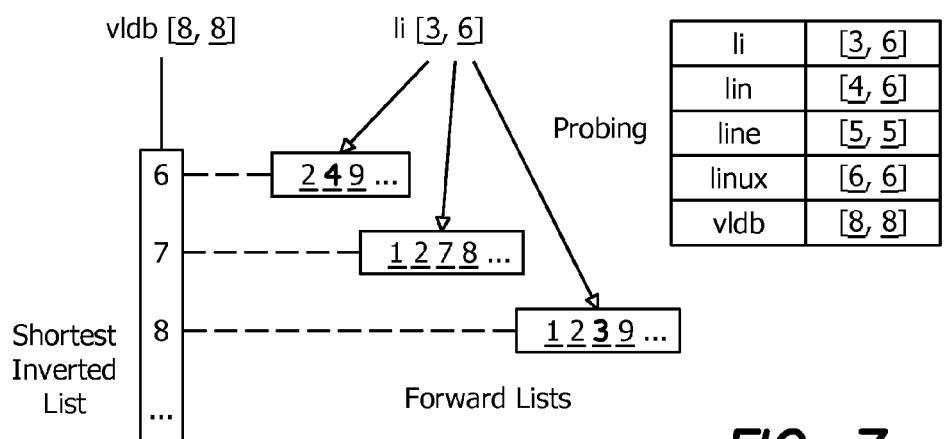
FIG. 7 is a diagram of prefix intersections using forward lists. Numbers with underlines are keyword IDs and numbers without underscores are record IDs.

FIG. 7 shows an example when a user types in a query "vldb li". The predicted keywords for "li" are "li", "lin", "line", and "linux". The keyword-ID range of each query keyword is shown in brackets. For instance, the keyword-ID range for prefix "li" is [3, 5], which covers the ranges of "lin" and "liu". To intersect the union list of "vldb" with that of "li", we first identify "vldb" as the one with the shorter union list. The record IDs (6, 7, 8, ...) on the list are probed one by one. Take record 6 as an example. Its forward list contains keyword IDs 2, 4, 8, .... We use the range of "li" to probe the forward list. By doing a binary search for the keyword ID 3, we find keyword with ID 4 on the forward list, which is then verified to be no larger than MaxID=6. Therefore, record 6 is an answer to the query, and the keyword with ID 4 (which appears in record 6) has "li" as a prefix.

Extension to Fuzzy Search:

The algorithm described above naturally extends to the case of fuzzy search. Since each query keyword has multiple active nodes of similar prefixes, instead of considering the union of the leaf nodes of one prefix node, now we need to consider the unions of the leaf nodes for all active nodes of a prefix keyword. The lengths of these union lists can be estimated in order to find a shortest one. For each record r on the shortest union list, for each of the other query keywords, for each of its active nodes, we test if the corresponding similar prefix can appear in the record r as a prefix using the forward list of r.

Cache-Based Intersection of Prefixes

Above we presented an algorithm for incrementally computing similar prefixes for a query keyword, as the user types the keyword letter by letter. Now we show that prefix intersection can also be performed incrementally using previously cached results.

We use an example to illustrate how to cache query results and use them to answer subsequent queries. Suppose a user types in a keyword query $Q_1$="cs co". All the records in the answers to $Q_1$ are computed and cached. For a new query $Q_2$="cs conf" that appends two letters to the end of $Q_1$, we can use the cached results of $Q_1$ to answer $Q_2$, because the second keyword "conf" in $Q_2$ is more restrictive than the corresponding keyword "co" in $Q_1$. Each record in the cached results of $Q_1$ is verified to check if "conf" can appear in the record as a prefix. In this way, $Q_2$ does not need to be answered from scratch. As in this example, in the following discussion, we use "$Q_1$" to refer to a query whose results have been cached, and "$Q_2$" to refer to a new query whose results we want to compute using those of $Q_1$.

Cache Miss:

a. Often the more keywords the user types in, the more typos and mismatches the query could have. Thus we may want to dynamically increase the edit-distance threshold δ as the query string is getting longer. Then it is possible that the threshold for the new query $Q_2$ is strictly larger than that of the original query $Q_1$. In this case, the active nodes of keywords in $Q_1$ might not include all those of keywords in $Q_2$. As a consequence, we cannot use the cached results of $Q_1$ (active nodes and answers) to compute those of $Q_2$. This case is a cache miss, and we need to compute the answers of $Q_2$ from scratch.

Reducing Cached Results:

The cached results of query $Q_1$ could be large, which could require a large amount of time to compute and space to store. There are several cases where we can reduce the size. The first case is when we want to use pagination, i.e., we show the results in different pages. In this case, we can traverse the shortest list partially, until we have enough results for the first page. As the user browses the results by clicking "Previous" and "Next" links, we can continue traversing the shortest list to compute more results and cache them.

The second case is when the user is only interested in the best results, say, the top-k records according a ranking function, for a predefined constant k. Such a function could allow us to compute the answers to the query $Q_1$ without traversing the entire shortest list, assuming we are sure that all the remaining records on the list cannot be better than the results already computed. In other words, the ranking function allows us to do early termination during the traversal. When using the top-k results of $Q_1$ to compute the top-k results of $Q_2$, it is possible that the cached results are not enough, since $Q_2$ has a more restrictive keyword. In this case, we can continue the unfinished traversal on the shortest list, assuming we have remembered the place where the traversal stopped on the shortest list for query $Q_1$.

Figure 8:
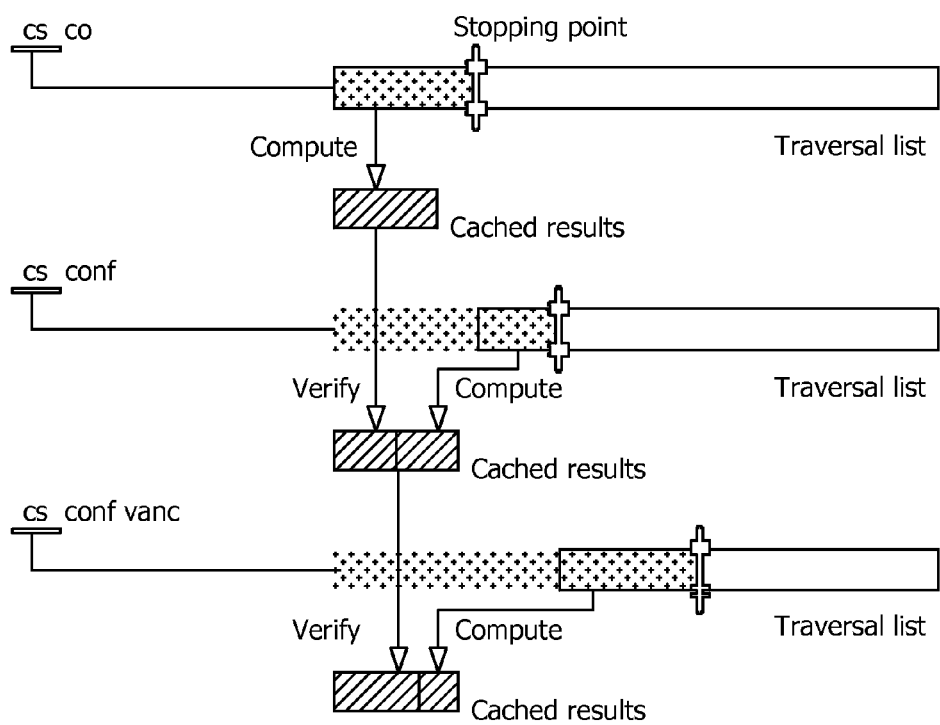
FIG. 8 is a diagram which depicts computing the top k results using cached answers and resuming unfinished traversal on a list.
Figure 9:
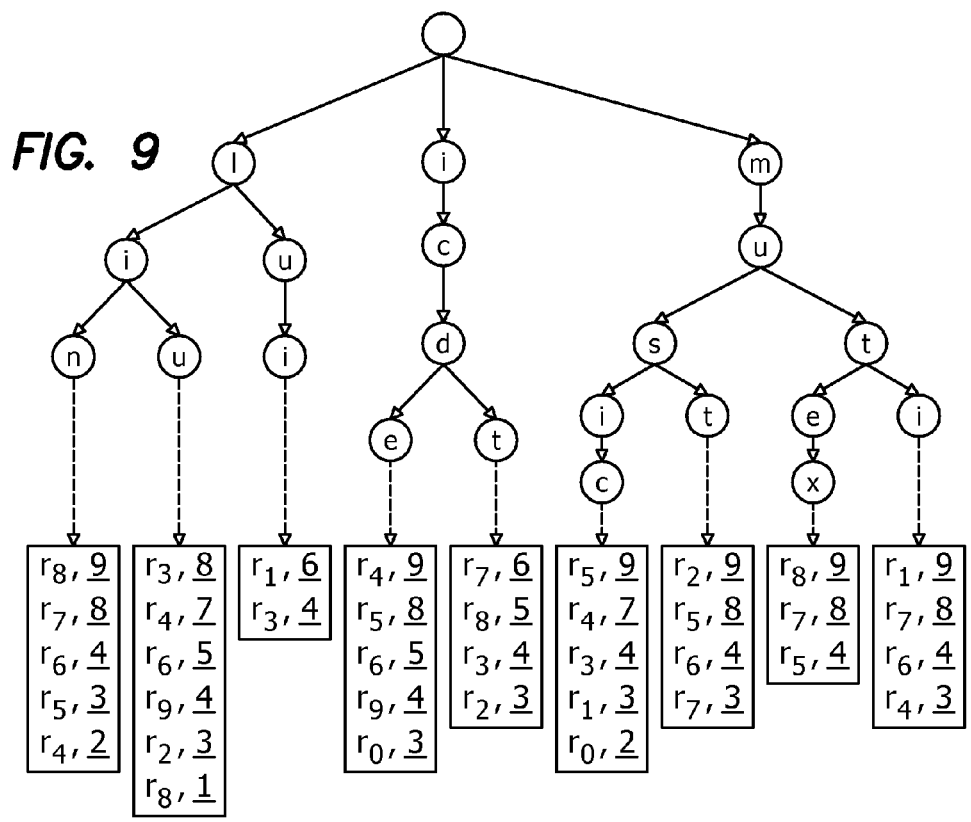
FIG. 9 is an index structure, namely a trie with inverted lists on the leaf nodes.
Figure 10:
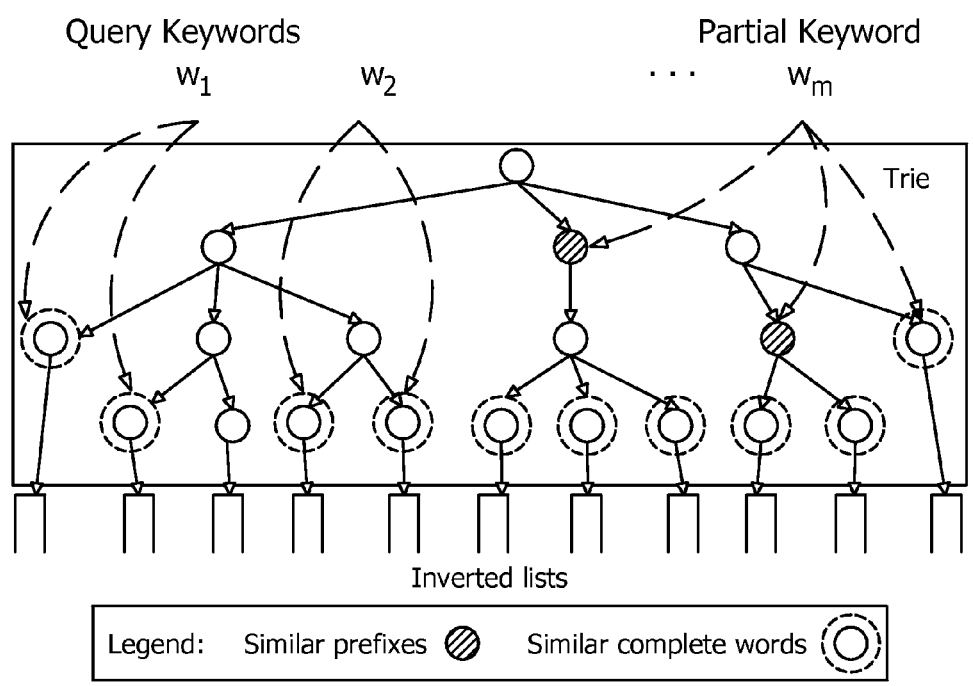
FIG. 10 is a diagram illustrating keywords similar to those in query $Q=[w_1, w_2, \ldots w_m]$. Each query keyword wi has similar keywords on the leaf nodes. The last prefix keyword wm has similar prefixes, each of which has several keywords on the leaf nodes.
Figure 11:
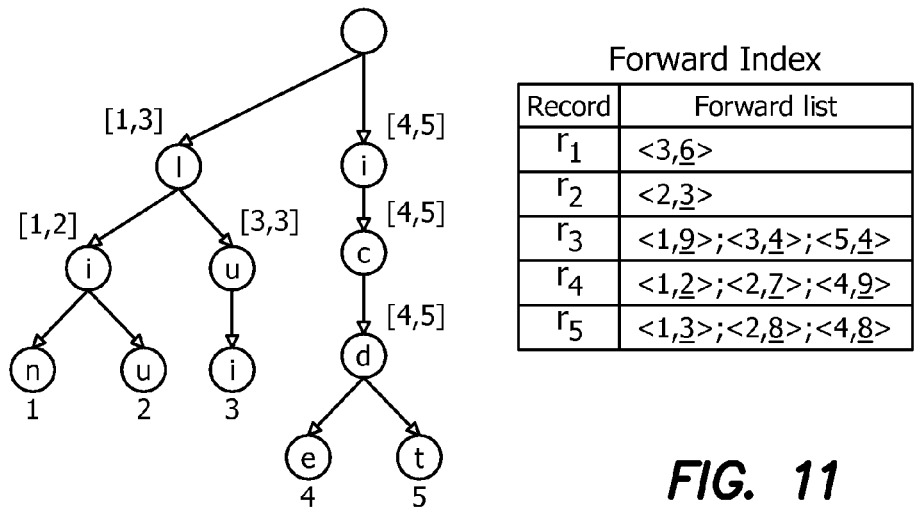
FIG. 11 is a diagram illustrating the probing of forward lists.
Figure 12:
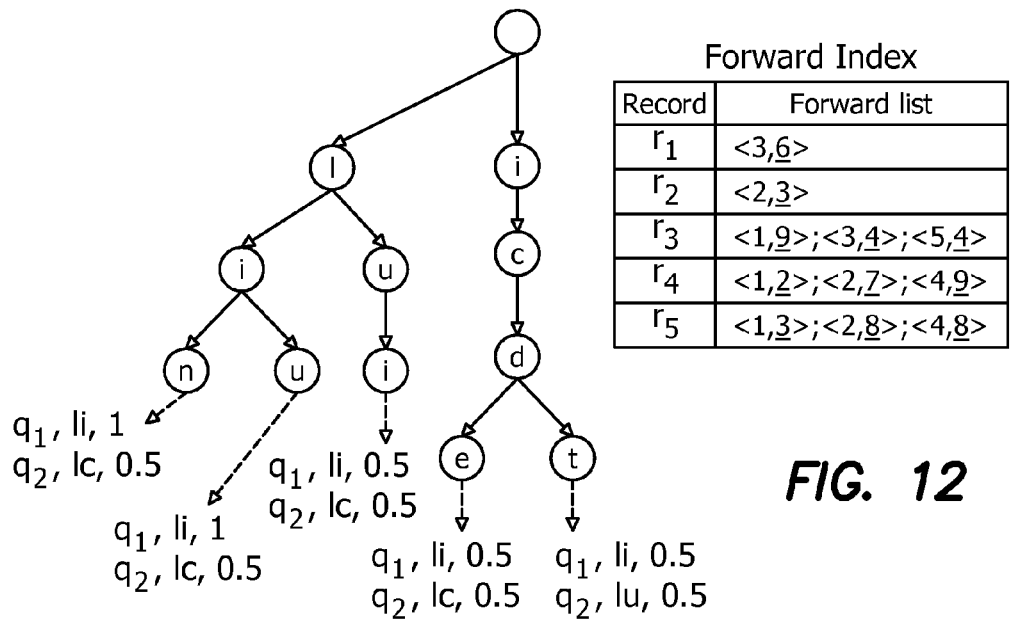
FIG. 12 is a diagram illustrating probing on leaf nodes.
Figure 13:
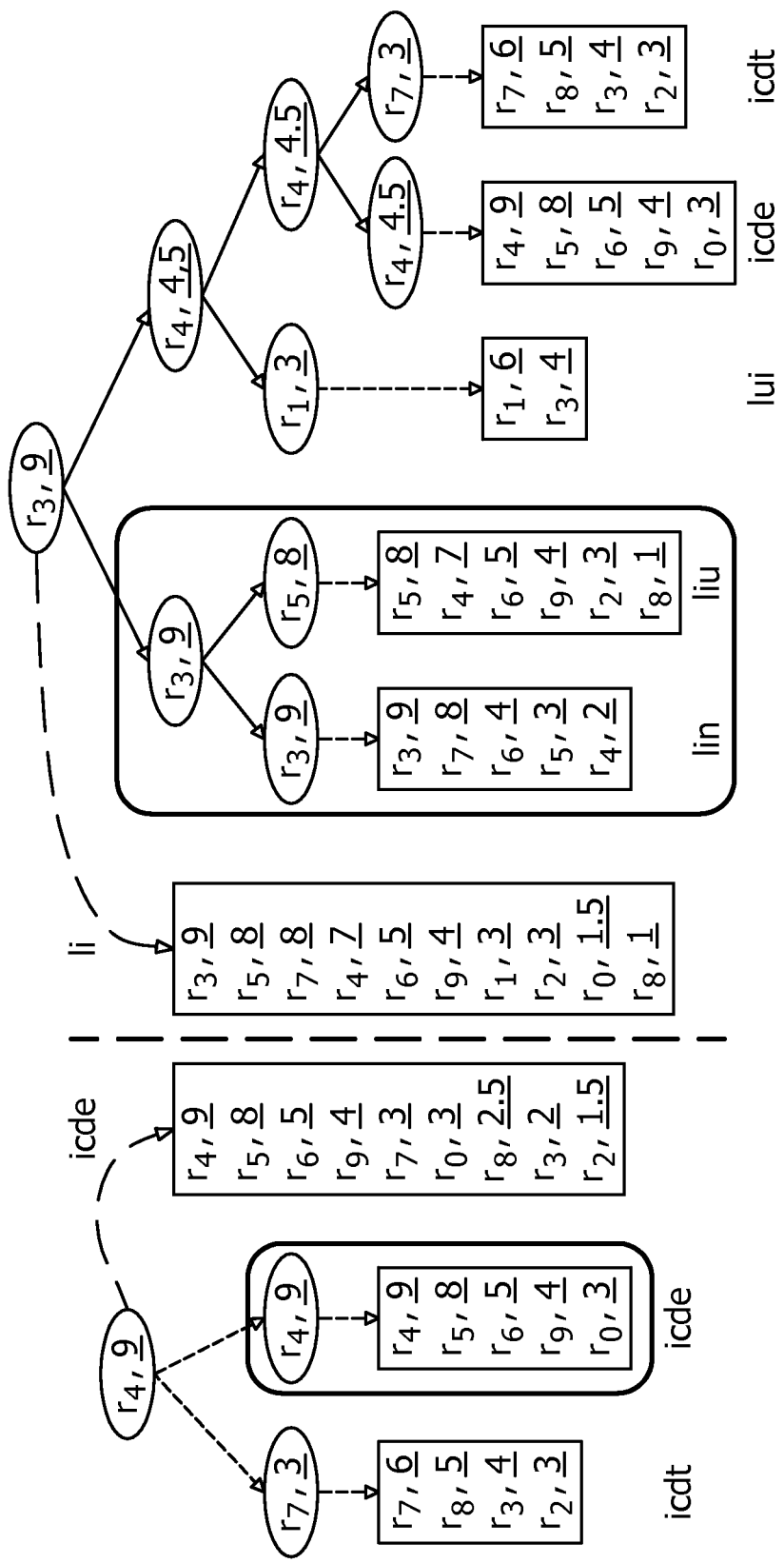
FIG. 13 is a diagram illustrating Max Heaps for the query keywords, "icde" and :"li". Each shaded list is merged from the underlying lists. It is "virtual" since we do not need to compute the entire list. The lists in a rectangle are those used to build a heap, which can prune other low score lists not in the rectangle.
Figure 14:
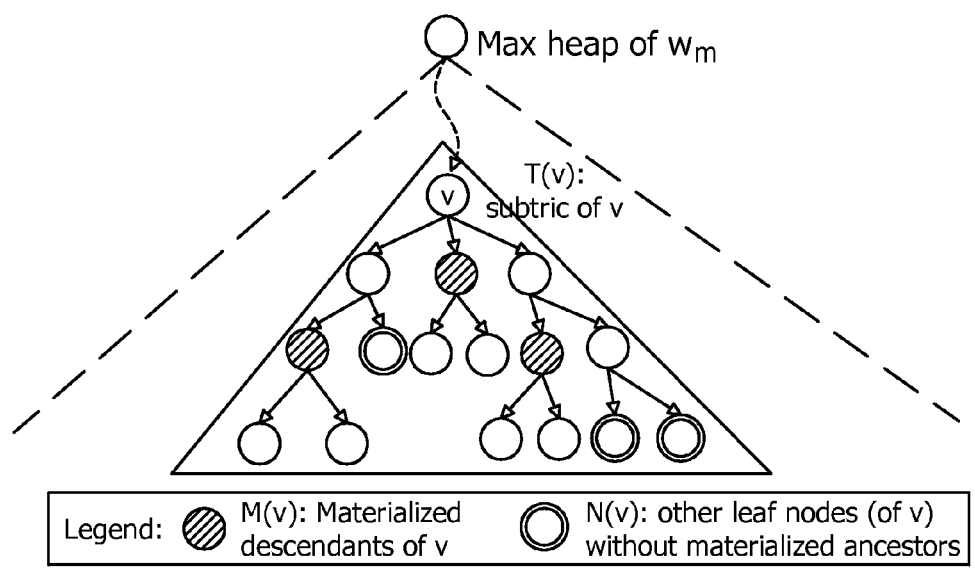
FIG. 14 is a diagram in which the benefits of materializing the union list $\cup(v)$ for a trie node with respect to the last query $w_m$ in the query.

FIG. 8 shows an example of incrementally computing top-k answers using cached results. A user types in a query "cs conf vanc" letter by letter, and the server receives queries "cs co", "cs conf", and "cs conf vanc" in order. (Notice that it is possible that some of the prefix queries were not received by the server due to the network overhead and the server delay.) The first query "cs co" is answered from scratch. Assuming the union list of keyword "cs" is the shorter one. The traversal stops at the first vertical bar. Each record accessed in the traversal is verified by probing the keyword range of "co" using the forward list of the record. Records that pass the verification are cached. When we want to answer the query "cs conf" incrementally, we first verify each record in the cached result of the previous query by probing the keyword range of "conf". Some of these results will become results of the new query. If the results from the cache is insufficient to compute the new top-k, we resume the traversal on the list of "cs", starting from the stopping point of the previous query, until we have enough top-k results for the new query. The next query "es conf vane" is answers similarly.

In the case of cache miss, i.e., earlier cached results cannot be used to compute the answers of a new query, we may need to answer the new query from scratch. We may choose a different list as the shortest one to traverse, and subsequent queries can be computed incrementally similarly.

Ranking

In the context of the foregoing a ranking function considers various factors to compute an overall relevance score of a record to a query. The following are several important factors.

a. Matching prefixes: We consider the similarity between a query keyword and its best matching prefix. The more similar a record's matching keywords are to the query keywords, the higher this record should be ranked. The similarity is also related to keyword length. For example, when a user types in a keyword "circ", the word "circle" is closer to the query keyword than "circumstance", therefore records containing the word "circle" could be ranked higher. In most cases exact matches on the query should have a higher priority than fuzzy matches.

b. Predicted keywords: Different predicted keywords for the same prefix can have different weights. One way to assign a score to a keyword is based on its inverted document frequency (IDF).

c. Record weights: Different records could have different weights. For example, a publication record with many citations could be ranked higher than a less cited publication.

As an example, the following is a scoring function that combines the above factors. Suppose the query is $Q=\{p_1, p_2, \ldots\}$, $p'_i$ is the best matching prefix for $p_i$, and $k_i$ is the best predicted keyword for $p'_i$. Let $sim(p_i, p'_i)$ be an edit similarity between $p'_i$ and $p_i$. The score of a record r for Q can be defined as:

$$\text{Score}(r, Q) = \sum_i [\text{sim}(p_i, p'_i) + \alpha * |p'_i| - |k_i|) + \beta * \text{score}(r, k_i)],$$

where α and β are weights (0<β<α<1), and score(r, $k_i$) is a score of record r for keyword $k_i$.

Highlighting Best Prefixes

Similarly, in the above context when displaying records to the user, the most similar prefixes for an input prefix should be highlighted. This highlighting is straightforward for the exact-match case. For fuzzy search, a query prefix could be similar to several prefixes of the same predicted keyword. Thus, there could be multiple ways to highlight the predicted keyword. For example, suppose a user types in "lus", and there is a predicted keyword "luis". Both prefixes "lui" and "luis" are similar to "lus", and there are several ways to highlight them, such as "luis" or "luis". To address this issue, we use the concept of normalized edit distance. Formally, given two prefixes pi and pj, their normalized edit distance is:

$$\text{ned}(p_i, p_j) = \text{ed}(p_i, p_j) / \max(|p_i|, |p_j|),$$

where |$p_i$| denotes the length of $p_i$. Given an input prefix and one of its predicted keywords, the prefix of the predicted keyword with the minimum ned to the query is highlighted. We call such a prefix a best matched prefix, and call the corresponding normalized edit distance the "minimal normalized edit distance," denoted as "mned". This prefix is considered to be most similar to the input. For example, for the keyword "lus" and its predicted word "luis", we have ned("lus", "l")=2 3, ned("lus", "lu")=1 3, ned("lus", "lui")=1 3, and ned("lus", "luis")=1 4. Since mned("lus", "luis")=ned ("lus", "luis"), "luis" will be highlighted.

Using Synonyms

In the above context we can utilize a-priori knowledge about synonyms to find relevant records in the same manner as discussed above.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for finding records relevant to a query among a set of records without requiring an exact spelling match between the query and the records comprising:

indexing the set of records to form a trie having a plurality of leaf nodes; invoking a first query containing a first prefix entered by a user;

computing and storing in a cache memory a first set of active nodes on the trie, the first set of active nodes being defined by the first prefix according to a similarity rule;

invoking a second query containing a second prefix entered by a user, the second prefix being based on the first prefix and including at least one additional character entered by the user;

computing a second set of active nodes on the trie using the first set of active nodes, the second set of active nodes being defined by the second prefix according to the similarity rule;

wherein the similarity rule comprises an edit-distance threshold in prefix spelling; and determining a result set of records using the computed second set of active nodes on the trie as a return to a keystroke that invokes the second query.

2. The method of claim 1 further comprising assigning, to each leaf node that corresponds to a word, a respective inverted list of IDs of records that contain the word, wherein the result set of records may be determined using the inverted lists of the descendants of theactive nodes of the invoked prefix.

3. The method of claim 1, wherein at least one of the first query and second query is invoked automatically as the user inputs a characterwithout requiring the user explicitly sending a search command.

4. A method for searching a record set $R=\{r_1, r_2, :::, r_n\}$ containing a distinct word set denoted by $W=\{w_1, w_2, \ldots, w_p\}$, where given two words, $w_i$ and $w_j$, "$w_i \leq w_j$" denotes that $w_i$ is a prefix of $w_j$, where a query consists of a set of prefixes $Q=\{p_1, p_2, \ldots, p_m\}$, $1 \leq m$ comprising:

building a digital trie using the word set W, the trie having a plurality of leaf nodes each corresponding to at least one word in the word set W;

assigning and storing a unique sequential number to each leaf node of the trie so that the order of the sequential numbers is consistent with alphabetical order of the respective word in the trie;

assigning, to each leaf node on the trie, an inverted list including IDs of the records containing the corresponding word of the leaf node;

creating, for each record, a forward listby converting each word in the record into a sequential number matching the sequential number of the leaf node corresponding to the word, and storing the sequential numbers converted from the words in the record in a sorted order;

identifying, for a first prefix $p_i$, forward lists of records whose ID is listed in a set of inverted lists associated with descendants of the first prefix $p_i$;

identifying, from records whose ID is listed in the set inverted list, a result set $R_Q$ including those records which satisfy constraints of the set of prefixes Q by analyzing the forward lists identified for the first prefix $p_i$ in view of numerical representations of other prefixes, if any, in Q; and returning top-t records in the identified result set $R_Q$ as a return to the query Q.

5. The method of claim 4, further comprising assigning, for each intermediate leaf node, an interval [min, max], where "min" and "max" are, respectively, the smallest value and the largest value of the sequential numbers of descendant leaf nodes of the intermediate node.

6. The method of claim 5, wherein analyzing numerical ranges of the forward lists identified for the first prefix $p_i$ in view of numerical representations of other prefixes, if any, in Q comprises:
- comparing the interval [min, max] assigned to the intermediate node corresponding to the respective other prefix with the forward lists identified for the first prefix pi; and
- selecting records whose forward list includes a value in the interval of the respective other prefix.

7. The method of claim 4, further comprising:
- identifying, for a first prefix $p_i$, additional forward lists of records whose ID is listed in the inverted lists of descendant leaf nodes of a set of active nodes defined by the first prefix $p_i$ according to a similarity rule, and wherein the result set $R_Q$ further includes those records which satisfy constraints of the set of prefixes Q by analyzing the additional forward lists in view of numerical representations of prefixes similar to other prefixes in Q according to the similarity rule.

8. The method of claim 7, wherein analyzing the additional forward lists in view of numerical representations of prefixes similar to other prefixes in Q comprises:
- for each of the prefix, comparing the interval [min, max] assigned to the intermediate node corresponding to the respective other prefix with the forward lists identified for the first prefix $p_i$; and
- selecting records whose forward list includes a value in the interval of the respective other prefix.

9. The method of claim 7, wherein the similarity rule comprises an edit-distance threshold in prefix spelling.

* * * * *